United States Patent
Bucur et al.

(10) Patent No.: US 12,338,307 B2
(45) Date of Patent: Jun. 24, 2025

(54) SOLID STATE BATTERIES

(71) Applicant: Piersica, Inc., Tallahassee, FL (US)

(72) Inventors: Claudiu B. Bucur, Sunrise, FL (US); Gary Allred, Wake Forest, NC (US)

(73) Assignee: Piersica, Inc., Tallahassee, FL (US)

( * ) Notice: Subject to any disclaimer, the term of this patent is extended or adjusted under 35 U.S.C. 154(b) by 0 days.

(21) Appl. No.: 18/656,307

(22) Filed: May 6, 2024

(65) Prior Publication Data

US 2024/0301109 A1    Sep. 12, 2024

Related U.S. Application Data

(62) Division of application No. 18/507,443, filed on Nov. 13, 2023, now Pat. No. 12,006,387.

(60) Provisional application No. 63/425,247, filed on Nov. 14, 2022.

(51) Int. Cl.
| | |
|---|---|
| H01M 4/04 | (2006.01) |
| C08F 4/04 | (2006.01) |
| C08F 232/08 | (2006.01) |
| C08L 45/00 | (2006.01) |
| H01M 4/62 | (2006.01) |
| H01M 10/0525 | (2010.01) |

(52) U.S. Cl.
CPC .............. *C08F 232/08* (2013.01); *C08F 4/04* (2013.01); *C08L 45/00* (2013.01); *H01M 4/624* (2013.01); *H01M 10/0525* (2013.01); *C08L 2203/20* (2013.01); *H01M 2300/0065* (2013.01)

(58) Field of Classification Search
CPC ............. H01M 2/1673; H01M 4/0409; H01M 10/0525; H01M 2/166; H01M 4/806; H01M 4/134; H01M 4/664; H01M 4/667; C08F 232/08; C08F 4/04; C08F 45/00; C08L 2203/20
See application file for complete search history.

(56) References Cited

U.S. PATENT DOCUMENTS

| | | | |
|---|---|---|---|
| 3,989,540 A | 11/1976 | Feuillade et al. | |
| 4,076,680 A * | 2/1978 | Akkapeddi | C08F 8/12 524/189 |
| 4,315,975 A | 2/1982 | Sekido et al. | |
| 4,794,060 A | 12/1988 | Belanger et al. | |
| 5,705,293 A | 1/1998 | Hobson | |
| 5,962,162 A | 10/1999 | Barrella et al. | |
| 7,279,251 B1 | 10/2007 | Yun et al. | |
| 7,642,012 B2 | 1/2010 | Djian et al. | |
| 7,794,511 B2 | 9/2010 | Wensley et al. | |
| 8,372,745 B2 | 2/2013 | Koike | |
| 8,389,587 B2 | 3/2013 | Pan et al. | |
| 8,574,772 B2 | 11/2013 | Suyama et al. | |
| 9,287,540 B2 | 3/2016 | Huang | |
| 9,331,323 B2 | 5/2016 | Huang | |
| 9,548,514 B2 | 1/2017 | Kyu et al. | |
| 10,074,835 B2 | 9/2018 | Lee et al. | |
| 10,084,207 B2 | 9/2018 | Bhardwaj et al. | |
| 10,158,109 B2 | 12/2018 | Eitouni et al. | |
| 10,256,503 B2 | 4/2019 | Bae et al. | |
| 10,886,560 B2 | 1/2021 | Kim et al. | |
| 11,742,494 B2 | 8/2023 | Bucur | |
| 12,006,387 B1 | 6/2024 | Bucur et al. | |
| 2012/0208070 A1 | 8/2012 | Nakashima et al. | |
| 2013/0078526 A1 | 3/2013 | Kojima et al. | |
| 2013/0260246 A1 | 10/2013 | Chen et al. | |
| 2016/0028114 A1 | 1/2016 | Pratt et al. | |
| 2016/0308243 A1 | 10/2016 | Herle et al. | |
| 2016/0365556 A1 | 12/2016 | Liu et al. | |
| 2017/0133662 A1 | 5/2017 | Cui et al. | |
| 2018/0026302 A1 | 1/2018 | Kumar et al. | |
| 2018/0083307 A1 | 3/2018 | Makino et al. | |
| 2018/0358597 A1 | 12/2018 | Liao et al. | |
| 2019/0181425 A1 | 6/2019 | Tour et al. | |
| 2019/0181496 A1 | 6/2019 | Visco et al. | |
| 2019/0190004 A1 | 6/2019 | Zheng et al. | |
| 2019/0221841 A1 | 7/2019 | Anandan et al. | |
| 2019/0245182 A1 | 8/2019 | Liao et al. | |
| 2019/0372149 A1 | 12/2019 | Cho et al. | |
| 2020/0112050 A1 | 4/2020 | Hu et al. | |
| 2020/0185778 A1 | 6/2020 | Lim et al. | |
| 2020/0266479 A1 | 8/2020 | Hupfer et al. | |
| 2020/0274155 A1 | 8/2020 | Li | |

(Continued)

FOREIGN PATENT DOCUMENTS

| | | |
|---|---|---|
| CN | 104939723 | 9/2015 |
| CN | 107492680 | 12/2017 |

(Continued)

OTHER PUBLICATIONS

U.S. Appl. No. 18/507,443, "Non-Final Office Action", Mar. 28, 2024, 7 pages.
U.S. Appl. No. 18/507,443, "Notice of Allowance", Apr. 19, 2024, 10 pages.
U.S. Appl. No. 18/507,443, "Supplemental Notice of Allowability", May 1, 2024, 2 pages.
PCT/US2021/029833, "International Search Report and Written Opinion", Aug. 13, 2021.
PCT/US2023/037203, "International Search Report and Written Opinion", Feb. 26, 2024, 13 pages.

(Continued)

*Primary Examiner* — Robert D Harlan
(74) *Attorney, Agent, or Firm* — Kilpatrick Townsend & Stockton LLP

(57) ABSTRACT

A polymer formed from a first monomer of vinylene carbonate and at least one second monomer different form the first monomer that does not contain a glycidyl group, wherein the molar ratio of the first monomer to the second monomer is from 4:1 to 99:1. The polymer, preferably the copolymer, dissolves metal salts and the composition of the copolymer and metal salt may have an ionic conductivity greater than 0.01 mS/cm. The polymer is suitable for use in various components of solid state batteries.

25 Claims, 4 Drawing Sheets

(56) References Cited

U.S. PATENT DOCUMENTS

| | | |
|---|---|---|
| 2020/0328423 A1 | 10/2020 | Li et al. |
| 2020/0365897 A1 | 11/2020 | Badding et al. |
| 2021/0344079 A1 | 11/2021 | Bucur |
| 2023/0352731 A1 | 11/2023 | Lv et al. |
| 2023/0395811 A1 | 12/2023 | Bucur |

FOREIGN PATENT DOCUMENTS

| | | |
|---|---|---|
| CN | 110518282 | 4/2021 |
| JP | 06223842 | 8/1994 |
| WO | 2018183771 | 10/2018 |
| WO | 2019133822 | 7/2019 |
| WO | 2021189083 | 9/2021 |
| WO | 2021222527 | 11/2021 |
| WO | 2022041702 | 3/2022 |

OTHER PUBLICATIONS

Bartholome et al., "Lithium Ion Batteries, What are Lithium Ion Batteries and How Do They Work?", Chem, Section 500, vol. 362, Dec. 4, 2023, 1 page.

Chai et al., "In Situ Generation of Poly (Vinylene Carbonate) Based Solid Electrolyte with Interfacial Stability for LiCoO2 Lithium Batteries", Advanced science, vol. 4, No. 2, Nov. 10, 2016, pp. 1-9.

Chen et al., "Poly (Vinylene Carbonate)-based Composite Polymer Electrolyte with Enhanced Interfacial Stability to Realize High Performance Room-temperature Solid-state Sodium Batteries", American Chemical Society Applied Materials and Interfaces vol. 11, No. 46, Oct. 29, 2019, 29 pages.

Ding et al., "Polymerization of Vinylene Carbonate as Well as Aminolysis and Hydrolysis of Poly(Vinylene Carbonate)", European Polymer Journal, vol. 37, Issue 12, Dec. 2001, pp. 2453-2459.

Grugeon et al., "Towards a Better Understanding of Vinylene Carbonate Derived SEI-layers by Synthesis of Reduction Compounds", Journal of Power Sources, vol. 427, Jul. 1, 2019, pp. 1-21.

Tijsma et al., "Investigations on Vinylene Carbonate, 2 a) Copolymerization with N-vinyl-2-pyrrolidone and Ethyl Vinyl Ether", Rapid communications, vol. 11, No. 10, Oct. 1990, pp. 501-506.

Zhao et al., "Polymer Electrolyte with Dual Functional Groups Designed via Theoretical Calculation for All-Solid-State Lithium Batteries", Journal of Power Sources, vol. 450, Feb. 29, 2020, 9 pages.

Zhou et al., "In Situ Formed Polymer Gel Electrolytes for Lithium Batteries with Inherent Thermal Shutdown Safety Features", Journal of Materials Chemistry A, vol. 7, No. 28, Jan. 1, 2019, pp. 1-9.

\* cited by examiner

SOLID STATE BATTERIES

CROSS-REFERENCE TO RELATED APPLICATIONS

This application is a divisional of U.S. application Ser. No. 18/507,443 by Bucur et al., entitled "POLYMER COMPOSITION AND METHODS FOR MAKING SAME," filed Nov. 13, 2023, and claims priority to U.S. Provisional Application No. 63/425,247 by Bucur et al., entitled "POLYMER COMPOSITION AND METHODS FOR MAKING SAME," filed Nov. 14, 2022, the entire disclosures of which are hereby incorporated by reference, for all purposes, as if fully set forth herein.

FIELD OF THE INVENTION

The present technology relates to a new polymer in particular a copolymer of a vinylene carbonate compound, fibers, and films made therefrom. More specifically, the present technology relates to the new polymer, more specifically a copolymer and methods for making the new copolymer and to the use of the new copolymer in battery separators, anodes, and/or cathodes.

BACKGROUND OF THE INVENTION

Metal-ion batteries, and in particular lithium-ion batteries, are omnipresent in modern electronics that demand increased performance while requiring recharging capabilities with ever restrictive size limitations. The commercialization of lithium into batteries in the early 1990's revolutionized battery technology offering single-use cells having significantly improved capacity and energy density and are in common use today. Key to these advancements are the chemical and physical properties of lithium. Chemically, lithium is highly electropositive, readily donating its valence electron to achieve a stable configuration, which makes it an excellent battery anode constituent. During the charging step of a commercial Li-ion battery, a graphite anode becomes reduced, and it accepts a $Li^+$ ion to compensate its internal charge. The cathode becomes oxidized and expels a $Li^+$ ion. During discharging, the graphite anode becomes oxidized and has to expel the lithium ion, which is accepted by the cathode, which in turn becomes reduced. This high reactivity, while also having the lowest molecular weight of all metallic elements, made lithium ideal for developing more powerful and lighter batteries. Today, more environmentally friendly rechargeable lithium-ion batteries have been developed making them suitable for modern high use applications that require frequent recharging such as portable electronics, military applications, and electric vehicles.

Conventional lithium-ion batteries utilize a liquid electrolyte solution to regulate the flow of lithium-ions (i.e., current) between two electrodes capable of ion storage known as the anode (negative electrode) and cathode (positive electrode). Between the anode electrode and the cathode electrode is typically a micro-porous polymer layer such as polyethylene or polypropylene layer which has the purpose of providing electronic separation and ionic conduction between the anode and cathode. During discharge, lithium-ions migrate from the anode to the cathode via a liquid electrolyte through the pores in the polymer layer, referred to as a separator. This current of ions drives the simultaneous current of electrons through an external circuit thereby powering a connected device. The process is reversed during the charging cycle, in which the ions flow from the cathode to the anode. Most commonly, the cathode is constructed from an aluminum foil current collector coated with a lithium cobalt oxide active material ($LiCoO_2$, commonly referred to as LCO).

Due to safety concerns associated with early versions of lithium metal anodes, anodes have been using a graphite active material on a copper foil current collector, which is highly stable although has 10 times less capacity for storing lithium. Such tradeoff resulted in batteries capable of repeated charge/discharge cycles while having reduced (but acceptable) energy density. Unfortunately, if the battery structure is compromised by an external force (such as penetration by a nail, etc.) or charged too quickly (causing plating of lithium metal rather than insertion of lithium between graphite sheets) quick thermal runaway and explosion or fire can occur. Specifically, the plating of lithium on the graphite anode is undesirable as the formation of metallic lithium dendrites can penetrate a porous separator and internally short circuit the battery as they reach the cathode. In addition, any lithium plating on top of the graphite can result in electrolyte decomposition, which in turn can result in gas release, swelling and reduced cycle life. This can present significant safety concerns for lithium-ion batteries, especially in portable batteries transported on passenger airlines or utilized in the increasingly popular electric vehicle. The majority of lithium-ion battery research focuses on ameliorating these inherent safety hazards; specifically, the uneven plating characteristics of lithium metal and flammability of liquid electrolyte solutions.

While safer than the early lithium metal anode, a graphite anode even when fully lithiated ($LiC_6$) has a severely decreased energy capacity, at 372 mAh/g, nearly ten times lower than the 3600 mAh/g of solid lithium metal anodes. One area of promising research has been the development of solid-state anodes having an alkali-metal anode, which may provide three or more times greater energy density, while maintaining the ability to evenly plate at charge cycling capabilities comparable to graphite anodes.

Another area of lithium-ion battery research has focused on the development of a separator capable of facilitating ion transport without the need for a liquid electrolyte solution. Conventional separators are microporous permeable membranes that decouple electronic diffusion from ionic diffusion. Composed of porous polyethylene or polypropylene (PE/PP), a liquid electrolyte solution is required for ion transport. Many liquid lithium-ion batteries utilize lithium hexafluorophosphate salt dissolved in organic carbonate solvents (e.g., ethylene carbonate with dimethyl carbonate) to facilitate ionic movement between the anode and cathode. Liquid electrolyte solutions are highly conductive (e.g., 10 mS/cm bulk conductivity) at room temperature. However, the legacy porous separator design dampens conductivity by a factor of 100 due to the tortuosity of its pores. The separator plays a critical role in the safety of batteries. The low melting point of polyolefin separators (135° C. for PE and 165° C. for PP) leads to poor thermal stability and potential failure of the separator. When temperatures exceed the melting point, the separator rapidly deteriorates and thermal shrinkage causes contact between the cathode and anode. This results in a thermal runaway reaction which can cause over pressurization, bursting of the encasement, and ignition of the liquid electrolyte. These safety concerns would be significantly reduced through the development of a thermally stable solid separator capable of ionic transport without the need of flammable organic liquid electrolyte solutions.

There have been recent efforts to make batteries having solid polymer electrolytes that reduce or eliminate the need for liquid electrolytes. The conventional polymer electrolyte used for this purpose is poly(ethylene oxide) (PEO), but PEO has a room temperature ion conductivity that is orders of magnitude lower than conventional organic liquid electrolytes solutions. Others have looked at mixtures of PEO and PEO-like polymers with other components for creating solid electrolytes/membranes. U.S. Pat. No. 9,548,514, for example, describes using poly (ethylene glycol) diacrylate (PEGDA) polymer, a lithium bis-trifluoro methane sulfonyl imide (LiTFSI) as the lithium salt, and succinonitrile (SCN) as a plasticizer, but these polymers tend to be low molecular weight and waxy and do not possess sustainable mechanical integrity. U.S. Pat. No. 9,287,540 describes the use of heat resistant particles such as ceramics and other metal oxides with traditional porous polymers such as cross-linked thermoset polymer particles and engineered thermoplastic polymers. U.S. Pat. No. 8,574,772 describes using a garnet-type compound and a phosphate group containing Li ion conductor to form a solid electrolyte. While these types of solid polymers are said to minimize some of the safety issues associated with liquid electrolytes, they have reduced mechanical properties including reduced flexibility and high reactivity with ambient air and moisture.

In view of the foregoing, the need exists for novel, flexible, light, and ionically conductive polymers for use in solid state batteries having improved performance and that address the safety concerns associated with conventional liquid lithium-ion electrolyte predecessors.

BRIEF SUMMARY OF THE INVENTION

The present technology relates to polymers and fibers and/or films made from these polymers. More specifically the polymer is a copolymer containing vinylene carbonate or vinylene derivatives or analogues copolymerized with certain compatible monomers which may be designed for a wide range of utilities as fibers and/or films. These polymers may have a variety of applications and are especially useful being incorporated into various features of batteries when combined with conductive metal salts. For example, the polymers may be formed into films, preferably the film is a conductive separator or used in and as a part of an anode and/or a cathode of a battery as a solid electrolyte. The separators made from the polymers of the invention are useful as part of a battery. In some aspects, the polymer may act as a solid electrolyte or as a binder. The separators made from the polymers of the invention are useful in batteries, particularly metal-ion batteries, but not limited to, lithium-ion, sodium-ion, potassium-ion, magnesium-ion, zinc-ion, aluminum-ion, or calcium-ion batteries. In one aspect, the polymers of the invention are formed into a conductive film for use as either a single or multi-layer separator. The invention is also directed to methods for synthesizing polymers with physical and chemical properties conducive for use in separators, and batteries using the separator.

The polymers of the disclosure ideally are capable of dissolving metal ion salts without the use of liquid solvents and may be formed into conductive films and/or separators useful in batteries to separate an anode from a cathode. Additionally or alternatively, the polymer may be used as part of the cathode and the anode as a solid polymer electrolyte when mixed with conductive salts and/or as a binder for maintaining the electrode integrity.

The batteries of the disclosure are useful in powering a variety of electronic applications, such as cell phones, smart watches, tablets, laptops, cars, bikes, drones, homes and planes. Other uses include applications useful by the military, such as battery containing backpacks, or any other portable application in which electricity is required such as drones, submarines, submersibles, tanks, and robots. Of course, the polymer is not limited to battery applications and may be used in any application for which the polymer properties are beneficial for example in applications in which a high melting point is required. Non-limiting examples of such applications for the polymers and films made therefrom include features in medical devices, aeronautics, space vehicles, bearings, pumps, pistons, chromatography columns, and electrical cables.

In one embodiment, the disclosure is directed to a copolymer comprising as copolymerized units a vinylene carbonate compound as a first monomer; and at least one additional monomer different from the first monomer and copolymerizable with the first monomer, with the proviso that the at least one additional monomer does not comprise a glycidyl group. In some aspects, the disclosure is directed to a copolymer as described herein with the proviso that the at least one additional monomer does not comprise an epoxy group and is not formed from a compound comprising an epoxy group. The molar ratio of the first monomer to the at least one additional monomer is from 4:1 to 99:1.

In another embodiment, the disclosure relates to a method for preparing the above-described copolymer, comprising: dissolving the vinylene carbonate compound in a solvent; contacting the at least one additional monomer with the vinylene carbonate compound and a polymerization initiator in the solvent under reaction conditions sufficient to copolymerize the vinylene carbonate compound and the at least one additional monomer to obtain the copolymer in a reaction mixture; precipitating the copolymer from the reaction mixture under conditions effective to precipitate the polymer; and isolating the copolymer from the reaction mixture. The solvent optionally is dimethyl sulfoxide, tetrahydrofuran, or N-methyl-2-pyrrolidone. The polymerization initiator optionally is 2,2'-azobis(2,4-dimethylvaleronitrile). The reaction conditions sufficient to copolymerize the vinylene carbonate compound and the at least one additional monomer optionally comprise a temperature of from 40° C. to 100° C. Beneficially, the method preferably has a copolymer yield greater than 50%, greater than 75% or greater than 90%.

In various embodiments, the first monomer is optionally selected from the group consisting of vinylene carbonate, a derivative of vinylene carbonate and an analogue of vinylene carbonate. The at least one additional monomer optionally is selected from or more optionally is selected from the group consisting of a poly(ethylene glycol) methacrylate (PEGMA), 1,3-propene sultone (PES), bis(2,2,2-trifluoroethyl) maleate (TFM), vinyl ethylene carbonate (VEC), dimethyl vinylphosphonate (DMVP), maleic anhydride (MA), diethylvinylphosphonate (DEVP), diethyl allylphosphonate (DEAP), or N-vinylpyrrolidone (NVP) (1-vinylpyrrolidin-2-one), N-methylmaleimide, vinylene sulfate, vinylene sulfite, vinyl ethylene sulfite, butadiene sulfone, vinylsulfonic acid (VSA), N,N-dimethylvinylsulfonamide, vinylsulfonyl fluoride, fluoro(vinyl) phosphinic acid, vinylphosphonic acid, 2-vinyl-1,3,2-dioxaphospholane-2-oxide, a metal vinylsulfonate, a metal vinylphosphonate, a metal fluoro(vinyl)phosphinate, 1-vinylpyrrolidine-2,5-dione, vinylboronic acid, a metal trifluoro(vinyl)boronate, 2-vinyl-1,3,2-dioxaborolane-4,5-dione, and a metal 2-fluoro-2-vinyl-1,3,2-dioxaborolate-4,5-dione. In some optional aspects, the at least one additional monomer comprises one or more of poly(ethylene glycol) methacrylate (PEGMA), vinyl ethylene carbonate (VEC), and/or dimethyl vinylphosphonate (DMVP). In some optional aspects, the at least one additional monomer comprises one or more of 2,2,3,3,3-pentafluoropropyl methacrylate (PFMA), 1,1,1,3,3,3-hexafluoroisopropyl methacrylate, and/or 2,2,3,3-tetrafluoropropyl methacrylate. The at least one additional monomer may comprise one, two, or more than two additional monomers, different from one another, and optionally selected from any of the aforementioned compounds.

In various aspects, the copolymer may or may not be crosslinked. The copolymer optionally has a molecular weight greater than 50,000 Da, e.g., greater than 80,000 Da, greater than 100,000 Da, greater than 150,000 Da, greater than 200,000 Da, or greater than 250,000 Da. In terms of ranges, the molecular weight preferably ranges from 250,000 Da to 2,000,000 Da, e.g., 680,000 Da to 2,000,000 Da, and a density from 0.5 g/cm$^3$ to 2.5 g/cm$^3$. Except where otherwise indicated, as used herein, "molecular weight" refers to weight average molecular weight (Mw). The copolymer may have a melting point of 200° C. or greater, or may not exhibit a melting point, in which case it preferably has an oxidation point of 350° C. or greater.

In another embodiment, the disclosure relates to a composition, comprising the above-described copolymer and a metal salt. The metal salt optionally comprises a metal ion selected from the group consisting of alkali metals, alkaline earth metals, aluminum, and zinc. The metal salt preferably is a lithium salt. For example, the lithium salt may be selected from the group consisting of lithium bis(trifluoromethanesulfonyl)amide (LiTFSA), lithium bis(oxalato)borate (LiBOB), lithium bis(trifluoromethanesulfonyl)imide (LiTFSI), LiPF$_6$, LiBF$_2$(C$_2$O$_4$), LiC$_2$O$_4$, CF$_3$CO$_2$Li, and C$_6$H$_5$COOLi. The composition preferably has an ionic conductivity at 25° C. of 0.01 mS/cm or greater as measured by electrochemical impedance spectroscopy. The composition optionally exhibits a decomposition onset current of 4.5 volts or greater vs Li0/Li+. The composition optionally has a lithium salt content from 20 wt % to 80 wt %, based on the total weight of the composition. In another embodiment, the disclosure relates to a film, filament, nonwoven web, or woven fabric, comprising the above-described composition.

In another embodiment, disclosed is a solid state battery, comprising: a solid state anode; a solid state cathode; and a solid state metal ion conductive separator sandwiched between the solid state anode and the solid state cathode; wherein at least one of the solid state anode and the solid state metal ion conductive separator comprise a component having the above-described composition. In a related aspect, the disclosure relates to a solid state lithium ion battery, comprising: a solid state anode capable of intercalation and de-intercalation of lithium ions; a solid state cathode capable of intercalation and de-intercalation of lithium ions; and a solid state lithium ion conductive separator sandwiched between the anode and the cathode; wherein at least one of the solid state anode, the solid state cathode and the solid state separator comprises a component having the above-described composition. The solid state lithium ion conductive separator optionally comprises the composition, and wherein the lithium salt is selected from the group consisting of lithium bis(trifluoromethanesulfonyl)amide (LiTFSA), lithium bis(oxalato)borate (LiBOB), lithium bis(trifluoromethanesulfonyl)imide (LiTFSI), LiPF$_6$, LiBF$_2$(C$_2$O$_4$), LiC$_2$O$_4$, CF$_3$CO$_2$Li, and C$_6$H$_5$COOLi. The solid state lithium ion conductive separator optionally further comprises at least one of (i) a polymer different from the copolymer, and (ii) an additive selected from the group consisting of a clay, a metal oxide, a metal nitride, and a lithium ion conductive ceramic. In some aspects, the solid state lithium ion conductive separator comprises a lithium conductive ceramic, wherein the lithium conductive ceramic is selected from the group consisting of lithium aluminum titanium phosphate (LATP), lithium lanthanum zirconium oxide (LLZO), lithium silicon phosphorous sulfur chloride (LSPSCl), lithium germanium phosphorous sulfide (LGPS), a lithium conductive halide, a closo-borate, and a nido-borate. Optionally, the solid state lithium ion conductive separator is in the form of a film having a thickness less than 30 microns, and wherein the film has an ionic conductivity of 0.05 mS/cm or greater. The solid state anode optionally comprises the above-described composition, wherein the lithium salt is selected from the group consisting of lithium bis(trifluoromethanesulfonyl)amide (LiTFSA), lithium bis(oxalato)borate (LiBOB), lithium bis(trifluoromethanesulfonyl)imide (LiTFSI), LiPF$_6$, LiBF$_2$(C$_2$O$_4$), LiC$_2$O$_4$, CF$_3$CO$_2$Li, and C$_6$H$_5$COOLi.

In another aspect the disclosure relates to a film comprising a polymer comprising a first monomer of a vinylene carbonate and a second monomer different from the first monomer and not having a glycidyl group; wherein a molar ratio of the first monomer to the at least one additional monomer is from 4:1 to 99:1. The film optionally further comprises a metal salt, has a thickness less than 30 microns, and an ionic conductivity of 0.05 mS/cm or greater. The conductive film may be in the form of a separator or a conductive layer in an electrode, e.g., in a battery.

BRIEF DESCRIPTION OF THE DRAWINGS

A further understanding of the nature and advantages of the disclosed technology may be realized by reference to the remaining portions of the specification and the drawings.

Figure 1:
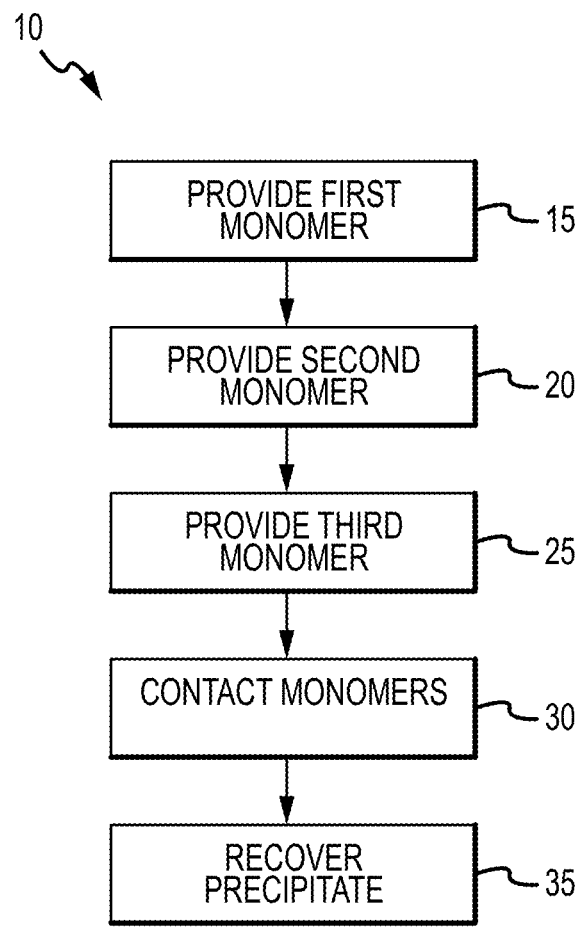
FIG. 1 illustrates operations of synthesizing a polymer according to embodiments of the present disclosure.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the letter.

DETAILED DESCRIPTION OF THE INVENTION

Introduction

Embodiments of the present invention are directed to polymers and fibers and/or films made from these polymers.

The fibers and/or films may function as a separator, or a part of an anode and/or part of the cathode. Notably, the polymer may be incorporated into part of a separator, or part of an anode (as electrolyte), or part of a cathode (as electrolyte). The separators are useful in batteries, particularly metal-ion batteries such as, but not limited to, lithium-ion, sodium-ion, potassium-ion, magnesium-ion, zinc-ion, aluminum-ion, or calcium-ion batteries. The disclosure also relates to methods for synthesizing the aforementioned polymers, ideally having physical and chemical properties conducive for use in separators and in electrodes for batteries. While discussed primarily in the context of energy storage systems, it will be appreciated that the polymers, fibers and films described herein may be employed in other applications.

In one embodiment, the disclosure relates to a polymer formed at least from a first monomer, comprising a substituted or unsubstituted vinylene carbonate or an analogue or derivative thereof; and a second monomer different from the first monomer and without a glycidyl group, and where the molar ratio of the first monomer to the second monomers is from 4:1 to 99:1. In one embodiment, the disclosure relates to a copolymer, comprising as copolymerized units: a vinylene carbonate compound as a first monomer; and at least one additional compound (e.g., and additional or second monomer) different from the first monomer copolymerizable with the first monomer; with the proviso that the at least one additional compound does not comprise a glycidyl group; wherein a molar ratio of the first monomer to the at least one second monomer is from 4:1 to 99:1. In some aspects, the at least one additional monomer does not comprise an epoxy group and is not formed from a compound comprising an epoxy group. In another embodiment, the disclosure relates to a method of synthesizing the copolymer, the method comprising dissolving the vinylene carbonate compound in a solvent; contacting the at least one additional compound with the vinylene carbonate compound and a polymerization initiator in the solvent under reaction conditions sufficient to copolymerize the vinylene carbonate compound (first monomer) and the at least one additional compound (second monomer) to obtain the copolymer in a reaction mixture; precipitating the copolymer from the reaction mixture under conditions effective to precipitate the polymer; and isolating the copolymer from the reaction mixture.

In another embodiment, the disclosure relates to a method of synthesizing the polymer, the method comprising (i) providing a first monomer in a solvent having substituted or unsubstituted vinylene group; (ii) dosing a second monomer, preferably in the same solvent, wherein the second monomer is different from the first monomer and does not contain a glycidyl group; (iii) contacting the first monomer with the second monomer in the presence of the solvent and an initiator under reaction conditions sufficient to form a reaction mixture comprising the polymer; and (iv) combining a precipitation agent, e.g., water or methanol, with the reaction mixture under conditions effective to precipitate the polymer.

In these aspects above, the molar ratio of the first monomer to the second monomer used in forming the polymer preferably ranges from 4:1 to 99:1.

Polymers and Methods for Making Polymers

Referring to FIG. 1, selected operations for a method 10 of synthesizing a polymer are illustrated. At operation 15, a first monomer may be provided, preferably in a reaction solvent. At operation 20, a second monomer may be provided, more preferably dosed into the first monomer. Alternatively, the second monomer may be provided before the first monomer. In some embodiments, a third monomer (or optionally more than three monomers) may be provided, optionally dosed, at operation 25. Of course, any order of addition may be employed depending on the specific monomers selected. Thus, for example, the optional third monomer may be added before, after, or between the providing or dosing of the first and second monomers. At operation 30, the monomers, including the first monomer, the second monomer, and the third monomer, if present, may be contacted with one another, preferably in the presence of the solvent and an initiator, under reaction conditions sufficient to react and form a reaction mixture comprising the polymer. At operation 35, the method 10 may include recovering a polymeric precipitate product, optionally by adding a precipitation agent under conditions effective to precipitate the polymer product, subsequent to contacting the monomers after a period of time needed to synthesize the polymer product.

In the present disclosure, the first monomer is a substituted or unsubstituted vinylene carbonate or an analogue or derivative thereof. In this context, the term "analogue" refers to a compound having a structure similar to that of another compound, e.g., vinylene carbonate, but differing from it in respect to a certain component. Importantly, the analogue contains a ring with a carbonate linkage and an endocyclic double bond. The term "derivative" refers to chemical compound formed from a parent compound, e.g., vinylene carbonate, through one or more chemical reactions and having a structure similar to that of the parent compound but different from it in respect to one or more components, functional groups, atoms, etc.

Thus, the first monomer may be unsubstituted vinylene carbonate, shown in formula (I) below:

(I)

Vinylene
Carbonate

In another aspect, the first monomer is substituted vinylene carbonate or an analogue or derivative of vinylene carbonate. For example, the substituted vinylene carbonate may be of the formula (II) below, wherein $R_1$ and $R_2$ are independently selected from any moiety, the same or different from one another, so long as at least one of $R_1$ and $R_2$ is not hydrogen. In some non-limiting exemplary embodiments, the moiety substituted on the vinylene carbonate may be selected from any substituted or unsubstituted alkyl, alkenyl, alkynyl, sultone, sulfone, maleate, phosphonate, sulfolene, or maleimide group. In some optional embodiments, in addition to the substituted or unsubstituted vinylene group, the first monomer may include an ether group or a carbonyl group, such as an aldehyde, a carboxylic acid, an amide, an ester.

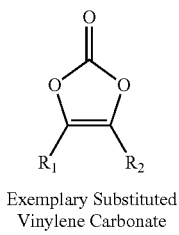

(II)

Exemplary Substituted Vinylene Carbonate

Of course, other substituted vinylene carbonate compounds, analogues, and derivatives are possible and are within the scope of the present disclosure even if said compounds are not covered by the general formula (II).

Figure 4A:
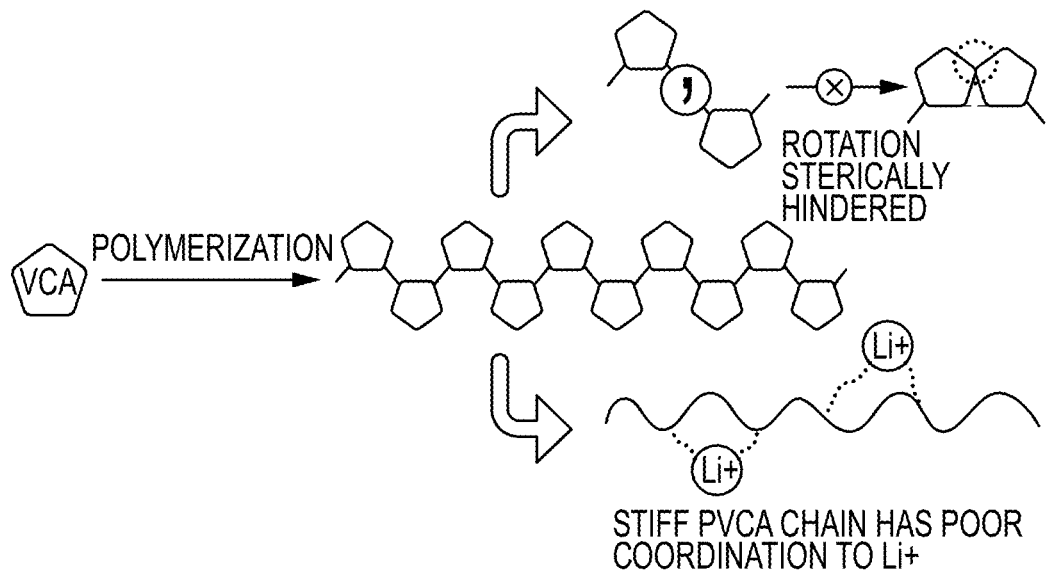
FIG. 4(a) illustrates a sterically hindered polymerization reaction.

Homopolymers of vinylene carbonate typically are often obtained at low molecular weight and are formed at low yield. Such homopolymers also exhibit low ionic conductivity in the presence of metal salts which may be explained by the low mobility of the polyvinylene carbonate (PVCA) chains. The building block of PVCA is a five-membered carbonate ring, which cannot freely rotate around its connecting bond due to steric hindrance. As a result, PVCA homopolymer chains cannot coordinate well to small cations such as Li$^+$ ion, as illustrated in FIG. 4(a) (carbonate moiety omitted for simplicity). In addition, homopolymers of vinylene carbonate have low solubility in solvents and are denatured by interaction with polar solvents. Due to strong rotational hindrance of the homopolymer, such strong solvents can break the polymer chain into pieces during the solvation process. As such, homopolymers of vinylene carbonate are difficult to solubilize in organic solvents and often require that the homopolymer be processed into fine particles prior to dissolution and require heat and prolonged mixing in order to form a homogenous solution. Moreover, vinylene carbonate homopolymer solutions are unstable which limits the ability to process further. For this reason, vinylene carbonate is typically polymerized in situ in battery applications and removal of impurities and further modification is not possible.

Figure 4B:
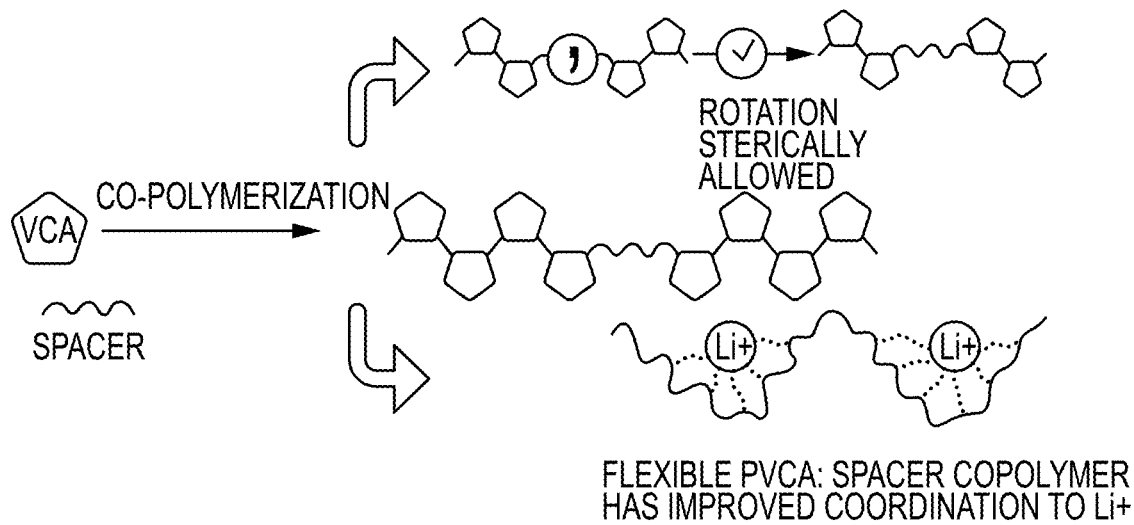
FIG. 4(b) illustrates a copolymerization reaction according to embodiments of the present disclosure. Several of the figures are included as schematics. It is to be understood that the figures are for illustrative purposes and are not to be considered of scale unless specifically stated to be of scale. Additionally, as schematics, the figures are provided to aid comprehension and may not include all aspects or information compared to realistic representations, and may include exaggerated material for illustrative purposes.

Without being bound by theory, it has now been discovered that incorporating a second monomer (also referred to herein as an additional compound or additional monomer) copolymerizable with the first monomer into a vinylene carbonate polymer chain within the disclosed monomer ratio during polymerization can improve polymer rotation and mobility by reducing overall steric hindrance, which surprisingly and unexpectedly results in improved coordination of metal cations, such as but not limited to lithium cations, and elevates the polymer conductivity at low temperature. In this way, the second monomer may act as a "spacer" monomer in the copolymer. Some potential interactions permitted by this increased polymer flexibility are illustrated in FIG. 4(b).

The second monomer or the at least one additional compound that is copolymerizable with the first monomer may include any monomer different from the first monomer, so long as the second monomer does not include a glycidyl group, which may have detrimental effects on overall copolymer yield and performance. Beneficially, the polymers, specifically the copolymers herein, have improved stability in an organic solvent such as DMSO such that the polymer does not readily break down in the organic solvent while also preferably providing a polymer weight average molecular weight greater than 50,000 Da, e.g., greater than 80,000 Da, greater than 100,000 Da, greater than 150,000 Da, greater than 200,000 Da, or greater than 250,000 Da, greater than 500,000, or greater than 680,000 Da. It has been discovered that the use of one or more additional compounds as comonomers in combination with the first monomer enables otherwise inaccessible polymerization reactions with yields greater than 50%, e.g., greater than 60%, greater than 70%, greater than 75%, greater than 80%, greater than 90%, or even approaching 100%, and the formation of higher molecular weight (Mw) copolymers than analogous reactions. It has also been discovered that the use of such one of more second monomers in combination with the first monomer enables formation of copolymers that have desirable mechanical and electrochemical properties suitable for use in various battery components, as described above.

In one embodiment, the at least one additional compound (second monomer) copolymerizable with the vinylene carbonate compound excludes linear alpha-olefins such as ethylene and propylene. In addition, the second monomer that is copolymerizable with the first monomer preferably does not include ethylene carbonate or propylene carbonate. In addition, the second monomer preferably excludes diol acrylates such as butane diol and hexane diol, or glycol acrylates such as triacrylates, diacrylates and monoacrylates. However, linear alpha-olefins or any aspects of the above excluded monomers can be used as a third monomer.

The disclosed polymers in one embodiment made from the vinylene carbonate or an analogue or derivative thereof (referred to generically as a "vinylene carbonate compound") and the second monomer do not require the use of oxirane or oxiranes or a nitrile compound such as succinonitrile (SCN). As such, the copolymer preferably is a non-crosslinked copolymer.

In embodiments, the additional compound (second monomer) copolymerizable with the first monomer includes a substituted or unsubstituted vinylene group, which may be characterized by the formula —CH═CH—. That is, the second monomer may be any additional compound containing a vinylene group, namely $R^3$—CH═CH—$R^4$ where $R^3$ and $R^4$ are selected from any moiety, the same or different from one another. The second monomer may or may not comprise at least one ring structure, which may be a 3, 4, 5, 6 atom ring structure. In this aspect, the $R^3$ and $R^4$ moieties may connect to one another through one or more intervening atoms to form a ring structure. In some aspects, the intervening atoms may comprise an alkyl chain, an alkenyl chain, or a carbonate group (as with vinylene carbonate). In some aspects the substituted or unsubstituted vinylene group comprises a substituted or unsubstituted vinyl group.

In other embodiments, the second monomer may include a substituted vinylene group of the formula —$CR^5$═$CR^6$—, wherein $R^5$ and $R^6$ are independently selected from any moiety, the same or different from one another, so long as at least one of $R^5$ and $R^6$ is not hydrogen. That is, the second monomer may comprise any compound containing a substituted vinylene group, namely $R^3$—$CR^5$═$CR^6$—$R^4$, wherein $R^3$, $R^4$, $R^5$, and $R^6$ are independently selected from any moiety, the same or different from one another, so long as at least one of $R^5$ and $R^6$ is not hydrogen. Notably, in some aspects, two or more of the $R^3$, $R^4$, $R^5$, and $R^6$ moieties may connect to one another through one or more intervening atoms to form a ring structure. In various optional embodiments, the second monomer may be an unsaturated cyclic carbonate. In some specific exemplary embodiments, the second monomer (or the at least one additional compound copolymerizable with the first monomer) may be 1,3-propene sultone (PES), bis(2,2,2-trifluoroethyl) maleate (TFM), vinyl ethylene carbonate (VEC), dimethyl vinylphosphonate (DMVP), maleic anhydride (MA), diethylvinylphosphonate (DEVP), diethyl allylphosphonate (DEAP), or N-vinylpyrrolidone (NVP) (1-vinylpyrrolidin-2-one), N-methylmaleimide, vinylene sulfate, vinylene sulfite, vinyl ethylene sulfite, butadiene sulfone, vinylsulfonic acid (VSA), N,N-dimethylvinylsulfonamide, vinylsulfonyl fluoride, fluoro(vinyl) phosphinic acid, vinylphosphonic acid, 2-vinyl-1,3,2-dioxaphospholane-2-oxide, a metal vinylsulfonate, a metal vinylphosphonate, a metal fluoro(vinyl)phosphinate, 1-vinylpyrrolidine-2,5-dione, vinylboronic acid, a metal trifluoro(vinyl)boronate, 2-vinyl-1,3,2-dioxaborolane-4,5-dione, or a metal 2-fluoro-2-vinyl-1,3,2-dioxaborolate-4,5-dione. For monomers containing a metal cation, the cation may be selected from any metal, but preferably is selected from lithium, sodium, potassium, calcium, and magnesium. In some preferred embodiments, the second monomer is poly(ethylene glycol) methacrylate (PEGMA), vinyl ethylene carbonate (VEC), or dimethyl vinylphosphonate (DMVP). Further compounds suitable for use as the second monomer include any of butyl cyanoacrylate, n-butyl acrylate, 2-acetoacetoxyethyl methacrylate, and pentafluoropropyl methacrylate.

The relative amounts and ratios of the first monomer and second monomer or the at least one additional compound used in forming the copolymer may vary. In preferred embodiments, the molar ratio of the first monomer to the second monomer or the at least one additional compound used in forming the copolymer may range from 4:1 to 99:1, e.g., from 8:1 to 99:1, from 15:1 to 99:1, from 25:1 to 99:1 or from 75:1 to 99:1. In terms of upper limits, the molar ratio of the first monomer to the second monomer or the at least one additional compound may be less than 98:1, less than 97:1, less than 96:1, less than 95:1, less than 90:1, less than 85:1, less than 80:1, less than 75:1, or less. Conversely, in terms of lower limits, the molar ratio of the first monomer to the second monomer or the at least one additional compound may be greater than 4:1, greater than 5:1, greater than 6:1, greater than 7:1, greater than 8:1, greater than 9:1, greater than 10:1, greater than 15:1, greater than 20:1, greater than 25:1, greater than 30:1, or greater than 75:1 or more. If the first monomer to second monomer or the at least one additional compound ratio is too low (too much spacer monomer), e.g., less than 4:1, the resulting polymer may be too soft. If the first monomer to second monomer ratio is too high (too little spacer monomer), then the resulting polymer may be too brittle. Without being bound by theory, it has now been discovered that employing the above-described ratios may result in a pliable, higher molecular weight polymer with better solubility in solvents and higher conductivity for ions relative to polymers formed solely from the first monomer.

A molar percentage of the first monomer in the polymer may be greater than 80%, and may be greater than 82%, greater than 84%, greater than 86%, greater than 88%, greater than 90%, greater than 91%, greater than 92%, greater than 93%, greater than 94%, greater than 95%, greater than 96%, greater than 97% or greater than 98%, or more, based on the total moles of all monomers used in forming the monomer. In terms of ranges, the first monomer in the polymer may be provided at a molar percentage from 80% to 99%, from 85 to 99%, or from 90 to 99%.

A molar percentage of the total of the second monomer or the at least one additional compound in the copolymer may be less than 20 mol. %, e.g., less than 15 mol. %, less than 14 mol. %, less than 13 mol. %, less than 12 mol. %, less than 11 mol. %, less than 10 mol. %, less than 9 mol. %, less than 8 mol. %, less than 7 mol. %, less than 6 mol. %, less than 5 mol. %, less than 4 mol. %, less than 3 mol. %, less than 2 mol. %, or less. In terms of ranges the second monomer may be present in an amount from 0.1 to 20 mol. %, e.g., from 0.1 to 15 mol. %, from 0.1 to 12 mol. %, from 0.1 to 10 mol. %, from 0.1 to 8 mol. %, or from 0.1 to 6 mol. %.

In one aspect, the at least one additional compound copolymerizable with the first monomer may comprise two additional compounds, i.e., a second monomer and a third monomer, and the third compound or third monomer may be selected from any of the aforementioned first or second monomers, so long as it is not the same monomer that is selected for the first and second monomers. Thus, for example, the optional third monomer may be selected from PEGMA, VEC, and DMVP, so long as the third monomer is different from the second monomer employed.

As previously discussed, at operation 30, the monomers, including the first monomer, the second monomer, and the optional third monomer, if present, may be contacted with one another in a reactor under conditions effective to react and form a copolymer. The specific vessels and reaction conditions employed may vary widely. In some aspects, the monomers are mixed together in a reactor, which may be any suitable polymerization reactor capable of withstanding the particular temperature and pressure conditions employed in the polymerization process. In one aspect, the reactor is a vial, round bottom flask, or a steel vessel, or larger commercial polymerization reactors. The polymer may be synthesized in a continuous, semi-batch or batch process. The monomers may be contacted at a temperature suitable for the polymerization process, which is typically dictated by initiator used. In some non-limiting embodiments, the temperature may range from 40 to 100° C., e.g., from 40 to 80° C., or from 50 to 70° C. The reaction may be conducted at atmospheric pressure, or at elevated pressure, e.g., from 1 to 5 atm. The reaction may be conducted with a residence time ranging from a few hours to several days, preferably in the range of 0.5 to 21 days, more preferably from 0.5 to 14 days, even more preferably from 0.5 to 7 days or from 0.5 to 2 days. The order of addition of the monomers may also vary widely depending largely on the reactivity of the monomers selected. Typically, all monomers are not added at once. Instead, in one aspect, the least reactive monomer will be added first, and the most reactive monomer will be added or dosed second. In one aspect the first monomer is added to the reactor before the second monomer. In another aspect, the second monomer is added before the first monomer. In another aspect the first and second monomers are added to the reactor simultaneously, at least in part. The monomers also may be added in stages (dosing) as desired.

At operation 30, the monomers may be contacted in the presence of a solvent and/or an initiator. In preferred aspects, a solvent is selected for its ability to dissolve the reagents (monomer and initiator) as well as the resulting polymer product. In addition, it should be relatively inert and not react during under reaction conditions. It should also be a liquid around the temperature of reaction as well as room temperature. The solvent may be or include, for example, any suitable solvent for dissolving the provided monomers, such as but not limited to dimethyl sulfoxide (DMSO), tetrahydrofuran, or N-methyl-2-pyrrolidone (NMP).

In preferred aspects, the polymerization reaction is a free-radical polymerization reaction. As such, an initiator may be provided to react with one or more of the monomers to begin the reaction and form one or more intermediate compounds capable of linking successively with the one or more other monomers. In exemplary embodiments, the initiator may be or may include azobisisobutyronitrile (AIBN) or 2,2'-azobis(2,4-dimethylvaleronitrile). Additionally available commercial initiators that may be used include a bifunctional peroxide such as Trigonox® (2,5-Dimethyl-2,5-di(tert-butylperoxy) hexane) or a diazo compound such as VAZO™ 52. The amounts of initiator used may vary widely, but in some exemplary embodiments may range from 0.01 to 1 mol %, e.g., from 0.01 to 0.8 mol %, from 0.02 to 0.5 mol %, or from 0.1 to 0.4 mol %.

In another aspect, an organic solvent such as alkanes, e.g., hexanes, may be used as a "non-solvent" medium for improved mixing the monomers and initiator without dissolving them. In this way, the reaction may be run without a true solvent and without running the reaction "neat."

The specific steps employed in recovering the resulting precipitate, or synthesized polymeric material, at operation 35 may vary widely. In one aspect, the step of recovering the product comprises dropping the reaction solution which contains the product into a non-solvent, e.g., methanol, which precipitates products of sufficiently high molecular weight and keeps in a solvated form ultra-low molecular weight components. Other possible non-solvents that may be used to precipitate the polymer include water, alkanes such as hexanes, toluene, ethanol, isopropyl alcohol, propanol, among others. The solvent may be slowly dosed in to form precipitated strings of polymer. The supernatant may then be decanted, and the product washed with additional non-solvent, e.g., MeOH, and then triturated with the non-solvent, e.g., MeOH, for a period of time from 1 to 48 hours, e.g., from 20 to 28 hours. The non-solvent may then be decanted and trituration optionally repeated. The isolated product may be dried, optionally under vacuum, at a temperature from 20 to 60° C., e.g., from 30 to 50° C., from 35 to 45° C., or at about 40° C., for a period from 0.5 to 4 days, e.g., from 1 to 3 days, or about 2 days, to yield off-white strings of polymeric product. In another aspect the polymer may be redissolved in a solvent and the process is repeated.

The molecular weight of the polymer may vary depending primarily on the intended use for the polymer. For some purposes, e.g., when used as an electrolyte in an electrode layer, it may be preferred to have a soft or waxy polymer of relatively lower molecular weight, while polymer intended for use as a separator, will preferably be more rigid, having a greater molecular weight. Similarly, polymer that is of a "sticky" consistency, having a mid-range molecular weight, can be beneficial as a binder composition, e.g., as a binder composition in an electrode. The precipitation step, and especially the non-solvent used in the precipitation step, can be important in determining the molecular weight of the polymer product. Selecting hexanes as the non-solvent precipitating agent, for example, may lead to the formation of extremely high viscosity, high molecular weight polymers suitable for use as a separator. Such polymers may require crushing devices, e.g., rock crushers, to break down large rock-like polymer products and form a polymer powder useful in preparing slurries for battery separators. The molecular weight of the polymer generally corresponds to and can be qualitatively measured based on the viscosity of the polymer in a 5-10 weight percent % solution. The preferred viscosity may vary depending on the desired application. For example, for blade casting separators or for spinning fibers, a 500 cP to 1000 cP, e.g., 500 to 750 cP, or 750 to 1000 cP, polymer may be desired, but viscosities outside these ranges are also possible depending, among other things, on the second monomer used.

Polymer and Film Properties

The polymers of the disclosure have unique structural and chemical properties making them highly useful in or as separators. Separators require the use of polymer films of certain thickness, pore size, pore size distribution, porosity, and chemical stability. In addition to these properties the separators will have functional properties such as electrical resistance (ER), permeability, and transport number.

Depending on its intended usage and on how the polymer is made, e.g., precipitated, the polymer may have a relatively low, medium, or high molecular weight. In some non-limiting embodiments, the polymer may have a weight average molecular weight greater than 50,000 Da, e.g., greater than 80,000 Da, greater than 100,000 Da, greater than 150,000 Da, greater than 200,000 Da, greater than 250,000 Da, greater than 250,000 Da, greater than 500,000 Da, greater than 680,000 Da, greater than 750,000 Da, greater than 1,000,000 Da, greater than 1,500,000 Da, or greater than 2,000,000 Da. In some embodiments, the polymer may have a molecular weight of less than 2,000,000 Da, less than 1,500,000 Da, less than 1,000,000 Da, less than 750,000 Da, less than 500,000 Da, or less than 250,000 Da. In terms of ranges, the molecular weight may range from 750,000 to 2,500,000 Da, e.g., from 900,000 to 1,300,000 Da, or from 1,000,000 to 2,000,000 Da.

Like the molecular weight, the density of the polymer may vary widely depending on its intended purpose. In some aspects, for example, the polymer has a density greater than 0.5 g/cm$^3$, e.g., greater than 0.6 g/cm$^3$, greater than 0.7 g/cm$^3$, greater than 1.0 g/cm$^3$, or greater than 1.5 g/cm$^3$, and less than 2.5 g/cm$^3$. In terms of ranges the polymer may have a density ranging from 0.5 to 2.5 g/cm$^3$, from 0.5 to 2.0 g/cm$^3$, from 0.5 to 1.5 g/cm$^3$, from 0.5 to 1.0 g/cm$^3$, from 0.6 to 0.9 g/cm$^3$, or from 0.7 to 0.8 g/cm$^3$.

Depending on the monomers selected, the polymer may or may not have a melting point. In most aspects, the polymer does not have a melting point, meaning that as the temperature of the polymer is increased, it oxidizes (burns) in air before reaching a melting point. Thus, in some embodiments, the polymer does not melt and has an oxidation point greater than 350° C., e.g., greater than 400° C., or greater than 450° C., optionally from 350° C. to 450° C. or from 375° C. to 425° C. That said, it is contemplated that with some second monomers, the polymer may have a melting point. In that case, the melting point is preferably greater than 200° C., greater than 300° C., or greater than 400° C.

The polymers of the disclosure have a dispersity greater than about 1.5, greater than about 2.0, greater than about 2.5, greater than about 3.0, greater than about 3.2, or greater than about 3.5. In terms of ranges, the dispersity may range from about 1.5 to about 6, e.g., from about 2 to about 5, from about 2.5 to about 4, from about 3 to about 4, from about 3.2 to about 4, or from about 3.5 to about 4. The molecular weight of the polymers of the disclosure are optionally greater than 50,000 Da, e.g., greater than 80,000 Da, greater than 100,000 Da, greater than 150,000 Da, greater than 200,000 Da, or greater than 250,000 Da. In an embodiment of the polymers of the disclosure, the polymers have a dispersity greater than about 1.5 (e.g., greater than about 2.0, greater than about 2.5, greater than about 3.0, greater than about 3.2, or greater than about 3.5) and a molecular weight greater than 50,000 Da, e.g., greater than 80,000 Da.

An important feature for many applications, especially battery applications, is that the polymer should have a relatively high ionic conductivity as determined by electrochemical impedance spectroscopy (EIS). Notably, the copolymer itself is not ionically conductive, but it beneficially can exhibit high conductivity when a metal salt is added.

Thus, in one aspect the present disclosure provides a composition containing the copolymer described in the previous aspects and a metal salt.

In one aspect, the metal salt comprises a metal ion selected from the group consisting of alkali metals, alkaline earth metals, aluminum, and zinc. In one aspect, the metal salt is a lithium salt selected from the group consisting of lithium bis(trifluoromethanesulfonyl)imide (LiTFSI), lithium bis(trifluoromethanesulfonyl)amide (LiTFSA), lithium bis(oxalato)borate (LiBOB), lithium bis(trifluoromethanesulfonyl)imide (LiTFSI), $LiPF_6$, $LiBF_2(C_2O_4)$, $LiC_2O_4$, $CF_3CO_2Li$, and $C_6H_5COOLi$.

Thus, conductive films manufactured according to the disclosure preferably are made from the polymer or more specifically the composition containing the copolymer of the disclosure, as described above, combined with a metal salt to form a polymer blend composition, specifically a conductive polymer blend. The polymer blend may then dissolved in a solvent and then evaporated after blade casting to form a conductive film as described herein. In various aspects, the conductive film or separator of the invention may be formed from the conductive polymer blends by any technique known for making films such as blade or tape casting, blowing, extruding, or spraying.

There are many ways in which the polymers of the disclosure may be made into films or separators. There are two primary commercial methods used, a dry process and a wet process. In a typical dry process, the polymers are made using a blown film process in which the polymer melt is extruded from an annular die and then collapsed or flattened using a nip roll. In this process, a tubular film filled with air that is continuously blown into the tubular film that cools and solidifies the film. It is also possible to produce the films or separators from the polymers of the invention using a cast film process. In the cast process, the extruded film rolls over a chilled roller to rapidly quench the melt. The films or separators may then be subjected to an annealing process for orienting the crystalline film or separator structures. The films or separators may be s further subjected to a stretching process that can be either cold or hot.

The wet process may include multiple steps including mixing, heating, extruding, stretching, and removing additives. The polymers in this process may be mixed with a solution and other additives including a metal salt in the case of making a separator to form a homogenous heated solution. The resulting solution may be extruded through a sheet die to produce a gel-like film that is then stretched or oriented. The additives and volatile solvent used then may be removed with heat in a drying process. In some embodiment, the polymers of the disclosure may be formed into nonwoven materials or fabrics. The nonwovens or fabrics may be made by continuously spinning filament fibers onto a moving belt. The fibers made from extruding the polymer into a flowing polymer melt. After the spinning process, the polymers emerge as thin, continuous filaments. The filaments may then be cooled, stretched, and solidified and converted into a mat. These mats then can be used as separators or make up a part of the anode or cathode. The mats can alternatively be combined with ceramics for use as separators. In a preferred embodiment, the polymers of the disclosure are made into fibers using an electrospinning process.

Ionic conductivity as described herein is determined with an electrochemical impedance spectroscopy analyzer on a conductive film formed from the polymers of the disclosure and LiTFSI at a 1:1.5 polymer:LiTFSI mass ratio, where the polymers are cast into a film prior to analyzing conductivity.

The conductive films of the disclosure optionally have a room temperature ionic conductivity as measured by electrochemical impedance spectroscopy analyzer in mS/cm greater than 0.01 mS/cm, e.g., greater than 0.05 mS/cm, greater than 0.1 mS/cm, greater than 0.15 mS/cm, greater than 0.2 mS/cm, or greater than 0.3 mS/cm. In terms of ranges, the conductivity of the conductive film may range from 0.01 to 0.3 mS/cm, e.g., from 0.05 to 0.3 mS/cm, from 0.1 to 0.3 mS/cm, from 0.15 to 0.3 mS/cm, or from 0.2 to 0.3 mS/cm. These conductivities compare very favorably to conventional liquid electrolyte separators, which comparably can have relatively low conductivities at room temperature. Similarly, conventional PEO solid polymer electrolytes with LiTSFI salt can have conductivities as low as 0.001 mS/cm at room temperature.

In one embodiment, the film made from the polymer of the disclosure, preferably when used as a separator, has a thickness less than 25 μm, less than 20 μm, less than 15 μm, less than 12 μm, less than 10 μm, less than 7 μm. The thickness of the films of the invention are typically in the range of from 5 μm to 25 μm, e.g., from 5 μm to 15 μm, or from 7 μm to 15 μm. The separator from the film made with the polymers, more specifically the copolymer composition of the disclosure may also vary for use in terms of thickness for use as part of the cathode or anode layer as desired. The thickness of the film or separators is measured by ASTM D5947-96.

In another embodiment, the conductive films of the disclosure have a thickness in the range of from 1 to 300 μm, e.g., 10 to 250 μm, from 50 to 250 μm, from 50 to 200 μm, or from 70 to 200 μm. When the films are intended for use as a battery separator, smaller thicknesses may be preferred, such as from 5 to 25 μm, e.g., from 5 to 20 μm, from 5 to 15 μm or from 5 to 10 μm. In other aspects, the conductive films may have a thickness greater than 10 μm, e.g., greater than 50 μm, greater than 70 μm, greater than 100 μm, greater than 200 μm, or greater than 300 μm.

Porosity can be a very important property for high permeability in films for use in particular as porous separators. Depending on application, it may be preferred to have a more uniform porosity to provide for the unhindered flow of the ionic current, namely Li ions to flow from between the cathode and anode. Porosity of the films or separators of the invention are measured using ASTM D-2873. The porosity of the films or separators of the disclosure optionally is greater than 40%, greater than 45%, greater than 50%, greater than 55%, or greater than 60%. In another embodiment, the porosity of the film or separator is in the range of 30% to 70%, e.g., 40% to 65%, 45% to 65%, or 50 to 65%.

In the manufacture of the film or separator of the disclosure, the film or separator optionally is stretched in the machine direction or the transverse direction or both. It is preferable to have as little shrinkage as possible in particular when the film is used as a separator. Shrinkage with heat is a common issue especially with separators made with other plastic materials. The films and separators of this invention have no to minimal shrinkage at greater than 150° C. or even higher. Shrinkage is calculated from the change in dimension Shrinkage (%)=$(L_i-L_f)/L_i \times 100$, where $L_i$ is the initial dimension and $L_f$ the final dimension after exposure to elevated temperatures. In one embodiment, the film or separators of the disclosure made in the wet process have shrinkage at 120° C. in the machine direction of less than 15%, less than 10%, less than 7%, or less than 5%. In one embodiment, the film or separators of the disclosure made in the wet process have shrinkage at 120° C. in the transverse direction of less than 10%, less than 7%, less than 5%, or less than 2%.

The films or separators of the disclosure preferably have excellent tensile strength properties. Tensile strength may be measured in the machine direction and the transverse direction and oftentimes depends on the manufacturing process. Uniaxially oriented films or separators have tensile strength measurements in one direction whereas biaxially oriented films or separators have both. Tensile strength may be determined according to ASTM D88-00. Ideally, the film or separator has sufficient mechanical strength such that during assembly of a battery necking or narrowing in width during a winding or unwinding can be minimized. In a preferred embodiment, the tensile strength of the films or separators of the disclosure in the machine direction are greater than 1000 kg/cm$^2$, greater than 1100 kg/cm$^2$, greater than 1200 kg/cm$^2$, or greater than 1400 kg/cm$^2$. In other embodiments, the tensile strength of the films or separators of the disclosure in the transverse direction may be greater than 700 kg/cm$^2$, greater than 750 kg/cm$^2$, greater than 800 kg/cm$^2$, or greater than 850 kg/cm$^2$. The conductive films of the disclosure also preferably exhibit a current density less than 0.1 mA/cm$^2$ at a voltage greater than 4 volts vs Li$^0$/Li$^+$ when measured via cyclic voltammetry, preferably greater than 4.5 volts vs Li$^0$/Li$^+$, more preferably greater than 5 volts vs Li$^0$/Li$^+$. In another embodiment, the conductive film of the disclosure has a normalized current less than 0.1 mA/cm$^2$ at a voltage in the range from 3 to 5 volts vs Li$^0$/Li$^+$, e.g., from 4 to 5 volts vs Li$^0$/Li$^+$, or from 4.5 to 5 volts vs Li$^0$/Li$^+$. In yet another embodiment, the conductive films of the disclosure have a normalized current less than 0.2 mA/cm$^2$ at a voltage greater than 4.2 volts vs Li$^0$/Li$^+$, e.g., greater than 4.5 volts vs Li$^0$/Li$^+$, greater than 4.7 volts vs Li$^0$/Li$^+$, greater than 4.8 volts vs Li$^0$/Li$^+$, or greater than 5 volts vs Li$^0$/Li$^+$. In another embodiment, the conductive film has a normalized current less than 0.2 mA/cm$^2$ at a voltage in the range of 3 to 5 volts vs Li$^0$/Li$^+$, e.g., from 4 to 5 volts vs Li$^0$/Li$^+$, or from 4.5 to 5 volts vs Li$^0$/Li$^+$.

The point at which current begins to flow unimpeded is considered in the art as the decomposition onset current. It is at this point where the polymeric material making up the film or separator breaks down resulting in detrimental effects to the integrity of the film and separator and its usefulness in a battery. In one aspect of the disclosure, the conductive film may have a decomposition onset current at greater than 4.5 volts vs Li$^0$/Li$^+$, e.g., greater than 4.7 volts vs Li$^0$/Li$^+$, greater than 4.8 volts vs Li$^0$/Li$^+$, greater than 4.9 volts vs Li$^0$/Li$^+$, or greater than 5 volts vs Li$^0$/Li$^+$, more preferably greater than about 6 volts vs Li$^0$/Li$^+$, and most preferably greater than about 7 volts vs Li$^0$/Li$^+$.

Prior art separators suffered from chemical and physical breakdown of the composition making up the separator at lower voltages. Conventional polyethylene oxide lithium solid polymer electrolyte (PEO), for example, is considered stable to only 3.7V vs Li$^0$/Li$^+$. Conventional porous separators infused with liquid electrolytes are considered stable to approximately 4.25 volts vs Li$^0$/Li$^+$. As a result, the battery cannot charge above the voltage where the decomposition onset current start flowing without decomposing the electrolyte or the separator. In order to increase the energy density of the battery it is desirable to charge to higher and higher voltages without decomposing the electrolytes and separators.

The conductive films of the disclosure are made from a polymer blend composition comprising the polymer of the invention and one or more metal salts such as lithium bis(trifluoromethanesulfonyl)imide (LiTFSI). The polymer blend composition and resulting conductive films made therefrom are substantially more stable where the conductive film has a polymer composition onset current that occurs at higher voltages. This effect is evidenced when measuring and interpreting a cyclic voltammetry (CV) which is a type of electrochemical analytical technique that measures the current as a result of the applied voltage. As the voltage is increased the current is measured, and if the polymer blend composition of the conductive film remains electrochemically stable, the change in current remains relatively small. This continues until the decomposition onset voltage is reached, at which point the current is visibly seen to increase unimpeded. Some examples of the disclosure, for example, surprisingly and unexpectedly exhibited a relatively constant current until about 5 volts vs. Li$^0$/Li$^+$.

The synthesized polymer may be formed into a wide variety of different morphologies depending on the intended application. In some aspects, for example, the polymer may be formed into fibers, e.g., as a fiber mesh, and/or films. To form the fibers and/or films, the synthesized polymer, as previously discussed, may be spun into fibers, e.g., through electro-spinning or air jet spinning. For separator applications, it may be desired to form a polymer film using blade casting, as described above.

In forming the fibers and/or film, one or more additives may be introduced to the synthesized polymer. For example, the additives may include metal oxides, nitrides, borates or lithium conductive ceramics. Specific examples of such additives may include silica, a low-density lightweight lithium conductive ceramic, for example, Li1+xAlxTi2-xP3O12 (LATP), LLZO, clay such as montmorillonite or attapulgite, zinc oxide, or boron/vanadium nitride, among others.

Battery Applications

Figure 2:
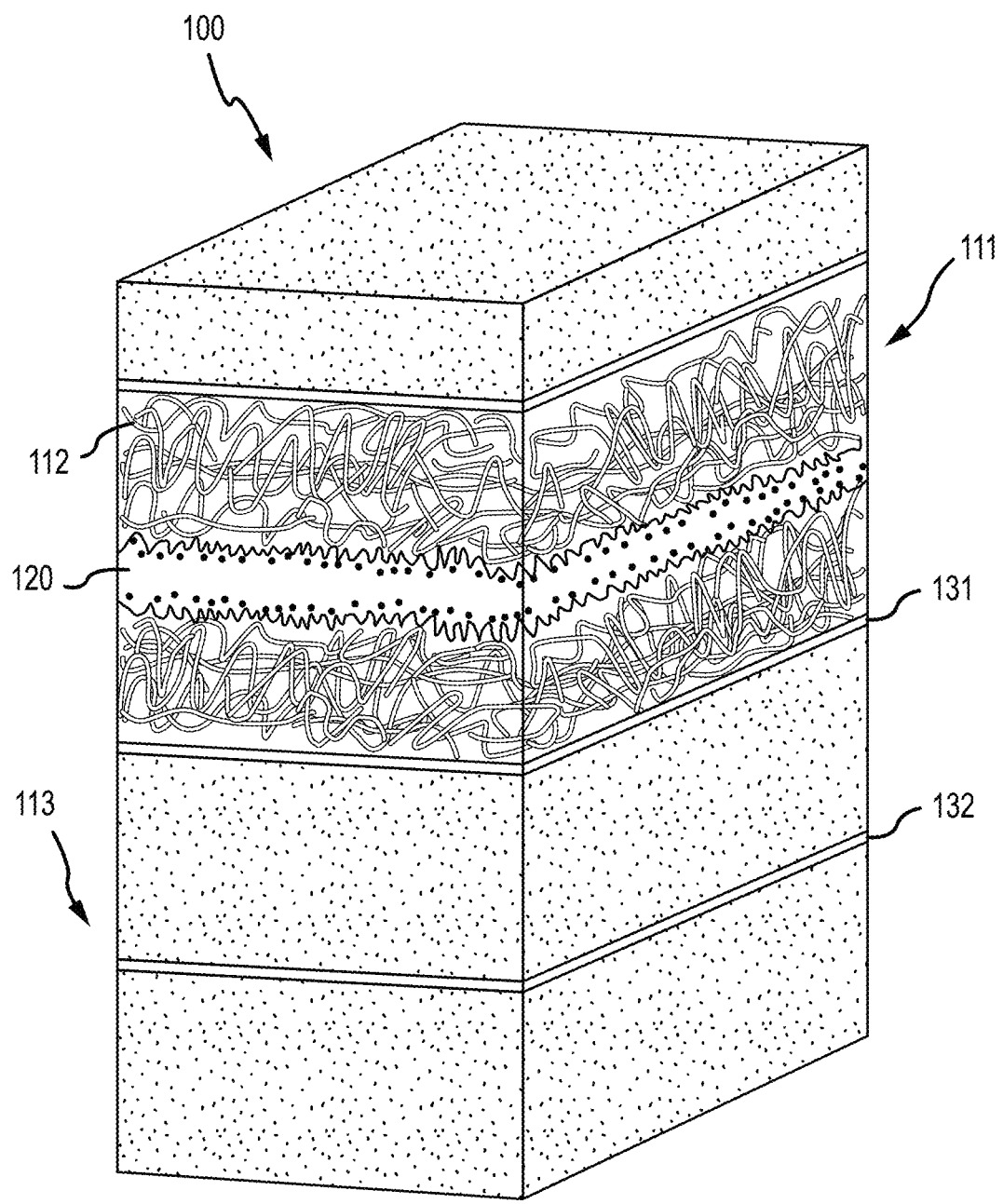
FIG. 2 illustrates a perspective view of a section of a lithium metal based battery according to embodiments of the present disclosure.
Figure 3:
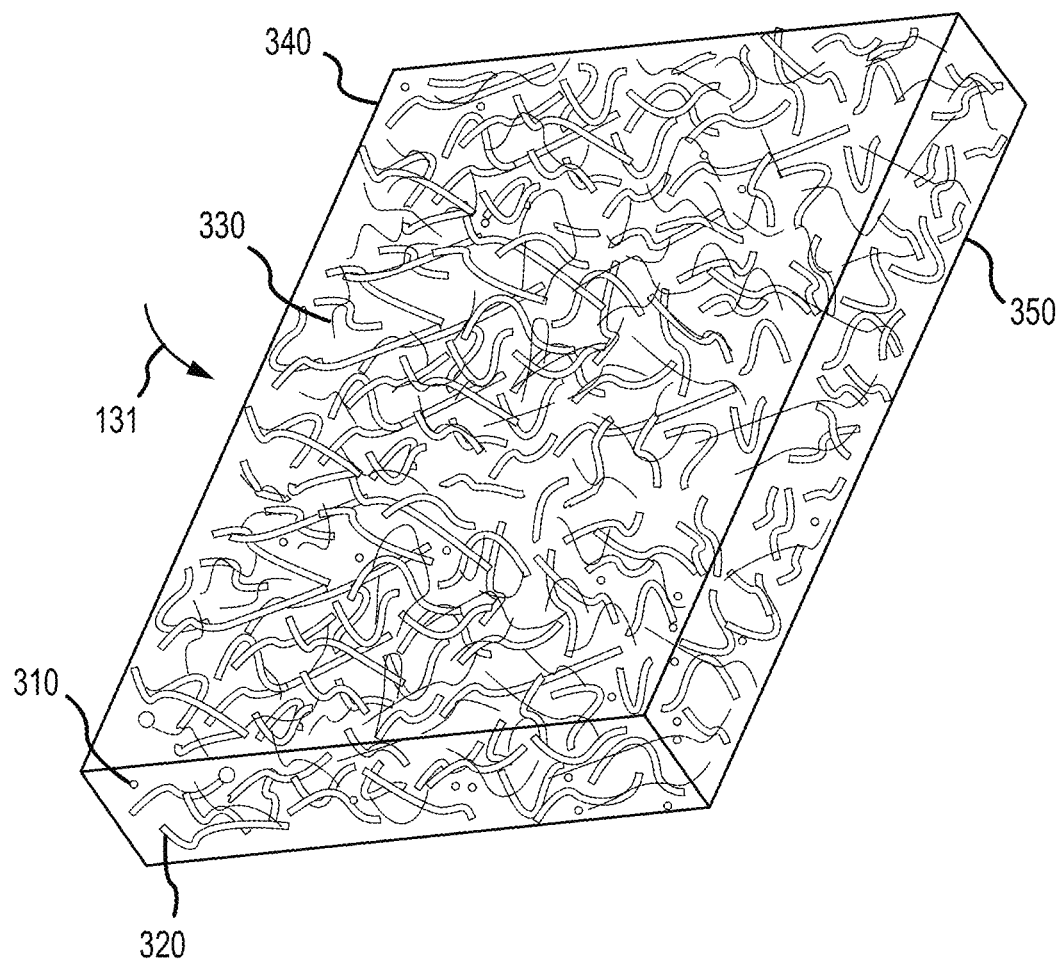
FIG. 3 illustrates a perspective view of a section of a solid separator for solid-state a lithium metal based battery according to embodiments of the present disclosure.

As discussed above, the polymers of the disclosure may be incorporated into various aspects of solid state batteries. Referring now to FIGS. 2 and 3, embodiments of solid separator 131 for solid-state lithium-ion batteries in addition to high energy density lithium solid-state anode 111 for solid-state battery 100 are depicted. Referring to FIG. 2, solid-state battery 100 includes a solid-state anode 111 having a solid electrolyte 112 with a fiber framework, optionally containing the polymer of the present disclosure. The solid-state battery 100 may include metal ion deposit 120. Solid-state battery 100 also includes cathode 113 having solid-state cathode current collector 132. A solid separator 131 may be positioned between the anode 111 and the cathode 113, one or more of which may comprise together or separately the polymer of the disclosure.

Solid-state anode 111 may be formed from one or more layers of solid electrolyte 112, which may be formed from a fiber framework comprising the polymer of the present disclosure. Generally, solid-state anode 111 may be understood as the negative or reducing electrode that releases electrons to an external circuit and oxidizes during discharge. Cathode 113 may be understood as the positive or oxidizing electrode that acquires electrons from the external circuit and is reduced during the discharge. In this embodiment, solid-state anode 111 may be comprised of solid electrolyte 112, which can be understood as a framework of interconnected fibers. Ideally, the solid electrolyte comprises lithium salt dissolved in a dry polymer of the disclosure as a solid solution. Of course, the solid electrolyte must be conductive to the appropriate metal ions, typically lithium ions. The framework of interconnected fibers of solid-state anode 111 containing a component made from the polymer of the disclosure may have a variety of properties and may be either flexible or rigid. In the case of a ceramic fiber framework, ceramic may be utilized to provide structure or support to solid-state anode 111 and solid-state battery 100, and the ceramic fiber may be used with or combined with the polymers of the disclosure. The ceramic fibers provide conductivity for lithium ions, but since they do not provide conductivity to electrons, the lithium metal cannot deposit on the fibers. Instead, the lithium metal will plate at the interface between the lithium conductive ceramic fiber and the current collector. As such, the plated lithium will fill in the voids between conductive fiber. Lithium metal at metal ion deposit 120 may provide the electronic conductivity for solid-state battery 100 while the solid ceramic framework/skeleton may provide volumetric support, surface layer for metal ion deposit 120 and lithium-ion conductivity.

One benefit of using a lithium conductive ceramic fiber mat of the present disclosure is to inhibit expansion and contraction caused by the plating and stripping of lithium metal during cycling. When a fiber mat is employed, the plating and stripping beneficially occurs inside the fiber mat framework, thereby preventing the expansion and contraction associated with many conventional solid state batteries. In an embodiment, the polymer of the disclosure is mixed or coated with a ceramic for imparting pores and/or flexibility. Thus, one means to combine, manufacture, "pre-lithiate" and/or operably engage metal ion deposit 120 with the fiber framework of solid electrolyte 112 may be through the partial melt infusion of lithium metal into a treated ceramic framework. Initially, only a small quantity of lithium metal may be needed to be infused into the pre-cell assembly of solid-state anode 111. In such a case where only a small quantity is infused into the pre-cell assembly of solid-state anode 111, most or even all reversible lithium which gives a cell its capacity will come from cathode 113 in the final assembly.

The lithium conductor aspect of solid-state anode 111 for solid-state battery 100 may be a polymer framework in solid electrolyte 112, where the polymer framework is comprised of the polymer of the disclosure. A polymer framework of solid electrolyte 112 within solid-state anode 111 may offer the added benefit of being flexible. This may offer various benefits and tradeoffs, both at the level of the individual cell or layer of solid-state battery 100. Requirements of a polymer framework, and materials therein deposited, of solid-state anode 111 optionally include: (a) having a melting point above the melting point of lithium metal (about 180° C.), (b) non-conductivity of lithium-ions, and (c) infusion with lithium conductive material into the structure of solid electrolyte 112, such as other conductive polymers with the corresponding lithium salt (e.g., lithium bis(trifluoromethanesulfonyl)imide/$LiC_2F_6NO_4S_2$/LiTFSI) or ceramic particles embedded into the polymer of the disclosure and/or upon its surface. In such embodiments, there may be additional components, methods of manufacture, and further variation that include various benefits and tradeoffs. These may include a fiber mat which extends throughout solid-state anode 111 and solid electrolyte 112. Furthermore, while not all coatings for ceramic fiber framework may be applicable to a polymer or polymer fiber framework, and while not all properties and features of a ceramic fiber framework may be directly applicable to a polymer or polymer fiber framework, some may.

Referring now to FIG. 3, a solid separator 131 for batteries, such as solid-state lithium-ion batteries, is depicted. Broadly described, solid separator 131 for solid-state lithium-ion batteries may be formed in one or more sheets, each sheet having a microscopic structure. The structure may include, but are not limited to, a main polymer of the disclosure 320, which may be formed from the first monomer and the second monomer as described herein (illustrated as the thicker of the two groups of long fibers throughout solid separator 131). Although the polymers of the disclosure preferably possess sufficient structural integrity that further support is unnecessary, in some optional embodiments, the structure may also include a structural polymer 330 (illustrated as the thinner of the two groups of long fibers throughout solid separator 131) and/or reinforcing additive 310 (illustrated as a group of circles throughout solid separator 131). It should be understood that, while each side of solid separator 131 may have unique or distinct features, qualities, chemical compositions, the like, and/or combinations thereof, top side 340 and bottom side 350 may be thought of as having indistinct characteristics for the purposes of this disclosure. That being said, should top side 340 operably engage with cathode 113, bottom side 350 would operably engage with anode 311. While not drawn to scale nor drawn to explicitly portray the microscopic appearance or structure of solid separator 131, FIG. 3 portrays an exemplary illustration in order to further demonstrate the purpose, structure, and formation of solid separator 131. Furthermore, those skilled in the art will appreciate the cross-sectional nature of the illustration of FIG. 3 and understand it may represent a small fraction of the material which may be required for even a single-cell solid-state lithium-ion battery. The thickness of solid separator 131 may be understood to be generally uniform, but at a microscopic level, gradations of thickness may be apparent. Solid separator 131 may be understood to be very thin, having a high surface area, and low density. Other objective qualities of solid separator 131 are understood and described below.

Optional structural polymer 330, as illustrated in FIG. 3, may be duplicated across length, width, and depth of solid separator 131 and may be understood to be generally and/or evenly distributed throughout solid separator 131. Properties of solid separator 131 are (i) lithium conductivity and (ii) electron insulation. An additional property which may be thought of as beneficial, though not critical, may be a low material density which may be required to yield cells with high energy density. As stated above, the lowest density solid materials are polymers, making lithium conductive polymers of the disclosure as an excellent candidate for solid separator 131 in order to provide both a backbone of a solid-state cell and lend it the property of high energy density. Lithium conductivity in a polymer is given by $Li^+$ coordinating sites which have high mobility. Such groups may include ethereal oxygens, carbonate oxygens or silicon-based polymers with similar functionalities such as siloxanes. Other $Li^+$ conductive sites on a polymer may be nitrogen-, phosphorous-, or sulfur-based such as those found in polydopamines, polyimides, polyphosphazenes, or polysulfonates. Preferably, the overall thickness of solid separator 131 should be less than 30 microns in thickness, such as less than or about 28 microns, less than or about 26 microns, less than or about 24 microns, less than or about 22 microns, less than or about 20 microns, less than or about 18 microns, less than or about 16 microns, less than or about 14 microns, less than or about 12 microns, less than or about 10 microns, or less. Solid separator 131 should also be free standing and stable in humid air. These requirements, in addition to benefiting the overall utility and functionality of solid separator 131, may facilitate adoption of solid separator 131, and solid-state batteries in general, by battery manufacturers across various markets. Their strength modulus may be improved by creating composites via mixing with inorganic materials, such as reinforcing additive 310. It is desirable that, in addition to main polymer 320 and structural polymer 330, these inorganic materials which may comprise reinforcing additive 310 are also lithium conductive and with low density. Such inorganic additives that may comprise reinforcing additive 310 may be clays, metal oxides, nitrides, or lithium conductive ceramics such as lithium aluminum titanium phosphate (LATP), lithium lanthanum zirconium oxide (LLZO), lithium silicon phosphorous sulfur chloride (LSPSCI), lithium germanium phosphorous sulfide (LGPS), lithium conductive halides, closo-/nido-borates, the like and/or combinations thereof. Electronic insulating carbon-based additives may also be used to form reinforcing additive 310. Whether inorganic or carbon-based, reinforcing additive 310 may remain as a small fraction of the composite while remaining useful for its reinforcing purpose. An exemplary amount for reinforcing additive 310 may be less than or about 10 wt. %.

The method of combination of main polymer 320, optional structural polymer 330, and optional reinforcing additive 310, or any two of those in combination, may be important to influencing the overall utility, structure, function, and use of solid separator 131. An exemplary method of combination of main polymer 320, structural polymer 330, and/or reinforcing additive 310 may be electrospinning. This may be understood as a method of combining polymers and inorganic materials into composites, or forming polymer/inorganic composites. Furthermore, production of solid separator 131 via electrospinning may be understood to produce a highly porous mat (i.e., a fibrous mat having >90% porosity), which may then be infused with a conductive polymer. Those skilled in the art of non-woven materials manufacturing may appreciate that laboratory-scale electrospinning may commonly be performed through application of high voltages between a metallic syringe needle and a conductive plate. Electrospinning may be a more adaptable fiber spinning technique than traditional melt spinning. Electrospinning can be performed via a room temperature process and can yield randomly aligned fiber mats or well-aligned fiber mats, depending on desired mat structure. The resultant fiber mat produced via this process can then remain exposed to ambient air while remaining non-reactive at room temperature. If the needle electrospinning method is used, hollow-core fibers may even be obtained by using co-axial needles. This approach can even further reduce the weight of solid separator 131. While issues of scaling this well-known laboratory procedure currently exist, viscoloids can be modified to spin fibers under a voltage via rotating conductive spirals without the use of needles, following the same principle. Using viscoloids, modified to spin fibers under a voltage via rotating conductive spirals without the use of needles may be a scalable process. Utilization of the modified viscoloid technique may be important to scalable production of main polymer 320, structural polymer 330, and reinforcing additive 310, or any two of those in combination, to form solid separator 131 in a solid porous mat.

The method of combination of main polymer 320, structural polymer 330, and reinforcing additive 310, or any two of those in combination, may also include blade casting to form solid separator 131. By blade casting polymer, inorganic, and/or lithium salt mixtures, one skilled in the art may form a sturdy, porous, fibrous mat with the lightweight properties described herein, suitable as solid separator 131. Blade casting may have the further benefit of being an already scalable process, one which is also already a traditional process known in the battery industry. For instance, virtually all battery electrodes may be assembled by this technique. The blade casting method of this mixture may provide more benefit within solid separator 131 which comprise polymer blends to achieve desired strengths at required thicknesses. However, it may be challenging to obtain large area solid separator 131 having thin (e.g., less than or about 30 micron) if a majority constituent composition of solid separator 131 is polymer composition, if said polymer composition is also free standing. This method may instead be more suitable for a complete layering cell assembly procedure where solid separator 131 is layered on top of electrodes in a top-to-bottom full inhouse multi-cell battery assembly. In this case, since assembly can occur concurrently with manufacture of solid separator 131, there is no need for the free-standing requirement described above. Some materials which can be used as components for a blade cast slurry to manufacture solid separator 131 include but are not limited to fumed silica (inorganic additive)+G4 (tetraglyme, solvent) and/or LiTFSA (Li salt), LiBOB, LiTFSI, $LiBF_2(C_2O_4)$, $LiBF_2(C_2O_4)$, $C_2O_4Li_2$, $CF_3CO_2Li$, $C_6H_5COOLi$, other lithium salts, the like, and/or combinations thereof.

In addition to the combination of main polymer 320, structural polymer 330, and reinforcing additive 310, or any two of those in combination, via electrospinning or blade casting, to form solid separator 131, it may be further important to provide interface coatings (or interfacing coatings) at an interface with anode or cathode. Since it may be desirable to maximize lithium conductivity across a thin (e.g., less than or about 30 micron) solid separator 131, additional treatment to top side 340 and/or bottom side 350 of solid separator 131 may be required in order to enable anode and cathode to reside at such close proximity, even in the presence of solid separator 131. In other words, the interface between anode and/or cathode and solid separator 131 may require additional treatment to ensure long term operation, durability, and sustainability of solid-state battery 100. This may be a serious issue especially at the interface with exposed lithium metal of solid-state anode 111. Interface coatings may generally be applied, formed, or otherwise reside at top side 340 and/or bottom side 350. Exemplary coatings which may stabilize and promote this interface include but are not limited to graphites/graphenes (i.e., carbons), nitrides/borates (e.g., boron nitrides, $MgB_2$, $Cu_3N$), metal alloys (e.g., Al coating from $AlX_3$ or $Al(NO_3)_3$ salts dissolved in solutions, In coating from $In(TFSI)_3$, $InF_3$, $In(NO_3)_3$, or salts dissolved in solutions thereof), sulfur (e.g., $Li_2S+S$, LPS), or a fluoroethylene carbonate (FEC) (i.e., fluoroethylene carbonate, a cathode stabilizer additive).

Components prepared or constructed according to the present embodiments may be characterized by increased electrical properties. For example, the battery may be characterized by a capacity of greater than or about 1200 mAh/g, e.g., greater than or about 1225 mAh/g, greater than or about 1250 mAh/g, greater than or about 1275 mAh/g, greater than or about 1300 mAh/g, greater than or about 1325 mAh/g, greater than or about 1350 mAh/g, greater than or about 1375 mAh/g, greater than or about 1400 mAh/g, or more. The battery may be characterized by an energy density of greater than or about 500 Wh/kg, e.g., greater than or about 525 Wh/kg, greater than or about 550 Wh/kg, greater than or about 575 Wh/kg, greater than or about 600 Wh/kg, greater than or about 625 Wh/kg, greater than or about 650 Wh/kg, or more.

Further, the separator made from the conductive films made from the polymers of this disclosure in one embodiment may be characterized by an ionic conductivity of greater than 0.01 mS/cm, as described above in connection with the disclosed polymers, and may be characterized by an ionic conductivity of greater than 0.05 mS/cm, greater than 0.10 mS/cm, greater than 0.15 mS/cm or greater than 0.20 mS/cm. In terms of ranges, the separator optionally has an ionic conductive from 0.01 to 0.3 mS/cm, e.g., from 0.05 to 0.25 mS/cm, or from 0.1 to 0.25 mS/cm.

Thus, in one embodiment the present disclosure provides a solid state battery, comprising: a solid state anode; a solid state cathode; and a solid state metal ion conductive separator sandwiched between the anode and cathode; wherein at least one of the solid state anode and the solid state separator comprise a component having the copolymer composition containing a metal salt as previously described.

In one embodiment the present disclosure provides a solid state lithium battery, comprising a solid state anode capable of intercalation and de-intercalation of lithium ions; a solid state cathode capable of intercalation and de-intercalation of lithium ions; and a solid state lithium ion conductive separator sandwiched between the anode and cathode; wherein at least one of the solid state anode, the solid state cathode and the solid state separator comprises a component having the copolymer composition containing a lithium salt as described above.

In an aspect of the solid state lithium battery embodiment, the solid state lithium ion conductive separator comprises the composition, and wherein the lithium salt comprises one or more selected from the group consisting of lithium bis(trifluoromethanesulfonyl)amide (LiTFSA), lithium bis(oxalato)borate (LiBOB), lithium bis(trifluoromethanesulfonyl)imide (LiTFSI), $LiPF_6$, $LiBF_2(C_2O_4)$, $LiC_2O_4$, $CF_3CO_2Li$, and $C_6H_5COOLi$. The solid state lithium ion conductive separator may further comprise at least one of (i) a polymer different from the copolymer and/or (ii) an additive selected from the group consisting of a clay, a metal oxide, a metal nitride and a lithium conductive ceramic. The solid state lithium ion conductive separator may comprise a lithium conductive ceramic selected from the group consisting of lithium aluminum titanium phosphate (LATP), lithium lanthanum zirconium oxide (LLZO), lithium silicon phosphorous sulfur chloride (LSPSCl), lithium germanium phosphorous sulfide (LGPS), a lithium conductive halide, a closo-borate, and a nido-borate. The solid state lithium ion conductive separator may be in the form of a film having a thickness less than 30 microns and wherein the film has an ionic conductivity of 0.05 mS/cm or greater.

In another aspect of the solid state lithium ion battery embodiment, the solid state anode comprises the composition, and the lithium salt is selected from the group consisting of lithium bis(trifluoromethanesulfonyl)amide (LiTFSA), lithium bis(oxalato)borate (LiBOB), lithium bis(trifluoromethanesulfonyl)imide (LiTFSI), $LiPF_6$, $LiBF_2(C_2O_4)$, $LiC_2O_4$, $CF_3CO_2Li$, and $C_6H_5COOLi$.

In another aspect of the solid state lithium ion battery embodiment, the solid state cathode comprises the composition, and the lithium salt is selected from the group consisting of lithium bis(trifluoromethanesulfonyl)amide (LiTFSA), lithium bis(oxalato)borate (LiBOB), lithium bis(trifluoromethanesulfonyl)imide (LiTFSI), $LiPF_6$, $LiBF_2(C_2O_4)$, $LiC_2O_4$, $CF_3CO_2Li$, and $C_6H_5COOLi$.

With respect to the above description, it is to be realized that the optimum dimensional relationships, to include variations in size, materials, shape, form, position, function and manner of operation, assembly, type of anode/cathode/battery container, type of connection(s), and use, all of which are intended to be encompassed by the present disclosure. It is contemplated herein that solid separator 131 and the various parts and components herein described may include a variety of overall sizes and corresponding sizes for and of various parts, including but not limited to solid-state anode 111, solid electrolyte 112, metal ion deposit 120, cathode 312, cathode current collector 132 the like and/or combinations thereof. Indeed, those various parts and components of solid-state battery 100 may vary in size, shape, etc. during the standard operation of solid-state battery 100. The description of the solid separator 131 herein mentions benefits for electric automobiles and other electronic devices, but the invention is not so limited. Solid separator 131 for solid-state lithium-ion batteries of the disclosure, as well as batteries manufactured therefrom, may have applications for powering other vehicles, computers, businesses, homes, industrial facilities, consumer and portable electronics, hospitals, factories, warehouses, government facilities, datacenters, emergency backup, aerospace, space travel, robotics, drones, the like and/or combinations thereof. The chemical formulas, metals, atomic and molecular compositions (the "disclosed formulas") provided herein are exemplary only. One skilled in the art would know that variations of the disclosed formulas may offer tradeoffs to the disclosed solid separator 131 for solid-state lithium-ion batteries and may be substituted to accomplish similar advantages to solid separator 131 for solid-state lithium-ion batteries of the disclosure. Furthermore, it is contemplated that due to variations in materials and manufacturing techniques, including but not limited to polymers, alloys, metals, assembly, tabbing, welding, atmospheric composition, the like and combinations thereof, that a variety of considerations may be considered with regard to battery manufacture. Yet still, though various methods of manufacturing and assembling a battery to accomplish the result(s) of a greater per-mass electric storage capacity (energy density), providing high currents of operation, increasing the durability and longevity of a battery, increasing the range at which a battery may reliably operate, provide a safer battery, and a more efficient means of production are contemplated, the disclosure is not limited to the specific components, the benefits herein recited and described, and/or the methods of manufacture recited herein.

The invention will be further understood in view of the following non-limiting examples. Comparative Examples are shown as "CE" below in the tables below, those that include M3 that is GLA or GMA. Example CE69 corresponds to Example 1 of CN110518282B. That example exhibited very low yield (14 wt. %) and was observed to have low viscosity, reflecting a low molecular weight.

EXAMPLES

The below tables set forth various examples of polymers formed that may be used in a separator, such as main polymer 320 in solid separator 131. Table 1 lists examples and sets forth the first monomer (M1), the second monomer (M2), and, if included the third monomer (M3). The polymers were prepared according to four synthesis protocols: Process A, Process B, Process C, and Process D, as described below. All Examples in Table 1 and 2 are labeled ("CE") are comparative examples.

TABLE 1

Process Parameters

| Ex. | M1 | M2 | M3 | M1 (g) | M1/M2 (Mol Ratio) | M1/M3 (Mol Ratio) | Initiator (mol %) | Rxn Solvent | Process (temp, °C.*) | % Yield |
|---|---|---|---|---|---|---|---|---|---|---|
| CE1 | VC | PEGMA500 | GLA | 14.6 | 47:1 | 47:1 | AIBN (0.02) | Hexanes | A | 29.7 |
| CE2 | VC | PEGMA360 | GLA | 300 | 18:1 | 46:1 | AIBN (0.02) | Hexanes | B | 45.1 |
| CE3 | VC | PEGMA500 | GLA | 14.6 | 47:1 | 47:1 | AIBN (0.02) | Hexanes | A | 41.5 |
| CE4 | VC | PEGMA360 | GMA | 323 | 18:1 | 46:1 | AIBN (0.01) | Hexanes | B | 35.3 |
| CE5 | VC | PEGMA360 | GMA | 100 | 18:1 | 46:1 | AIBN (0.02) | Hexanes | B | 43 |
| CE6 | VC | PEGMA500 | GLA | 8 | 47:1 | 47:1 | AIBN (0.02) | Hexanes | A | 30 |
| CE7 | VC | PEGMA360 | GLA | 8 | 15:1 | 45:1 | AIBN (0.02) | Hexanes | A | 32.6 |
| CE8 | VC | PEGMA360 | GLA | 8 | 3:1 | 5:1 | AIBN (0.02) | Hexanes | A | ND* |
| CE9 | VC | PEGMA360 | GLA | 8 | 18:1 | 46:1 | AIBN (0.02) | Hexanes | A | 29.8 |
| CE10 | VC | PEGMA360 | GLA | 8 | 18:1 | 46:1 | AIBN (0.02) | Hexanes | A | 26.8 |
| CE11 | VC | PEGMA1000 | GLA | 8 | 51:1 | 46:1 | AIBN (0.02) | Hexanes | A | 47.3 |
| CE12 | VC | PEGMA360 | GMA | 8 | 18:1 | 46:1 | AIBN (0.02) | Hexanes | A | 24.9 |
| CE13 | VC | PEGMA360 | GMA | 16 | 18:1 | 46:1 | AIBN (0.02) | Hexanes | A | 22.4 |
| CE14 | VC | PEGMA360 | GMA | 8 | 18:1 | 46:1 | AIBN (0.02) | Toluene | A | ND |
| 15 | VC | PEGMA360 | | 2.5 | 20:1 | | AIBN (0.8) | DMSO | D | ND |
| 16 | VC | PEGMA360 | | 10 | 18:1 | | AIBN (0.025) | Hexanes | A | 105.7 |
| 17 | VC | PEGMA360 | | 10 | 18:1 | | AIBN (0.09) | Hexanes | A | 97.5 |
| 18 | VC | PEGMA360 | | 10 | 18:1 | | AIBN (0.2) | Hexanes | A | 80.3 |
| 19 | VC | PEGMA360 | | 10 | 18:1 | | AIBN (1.05) | Hexanes | A | 69.6 |
| 20 | VC | PEGMA360 | | 5 | 18:1 | | AIBN (0.4) | Toluene | A | ND |
| 21 | VC | PEGMA360 | | 5 | 18:1 | | AIBN (0.8) | DMSO | D | 57.3 |
| 22 | VC | PEGMA360 | | 5 | 18:1 | | VAZO 52 (0.8) | DMSO | D | 34.4 |
| 23 | VC | PEGMA360 | | 50 | 18:1 | | VAZO 52 (0.4) | DMSO | C (40) | 45.8 |
| CE24 | VEC | PEGMA360 | GMA | 2.5 | 18:1 | 46:1 | AIBN (0.02) | Hexanes | A | ND |
| CE25 | VEC | PEGMA360 | GMA | 2.5 | 18:1 | 46:1 | AIBN (0.02) | Hexanes | A | 30 |
| CE26 | VEC | PEGMA360 | GMA | 6 | 18:1 | 46:1 | AIBN (0.02) | Hexanes | A | 25.1 |
| CE27 | VC | VEC | GMA | 5 | 18:1 | 46:1 | AIBN (0.02) | Hexanes | A | 18 |
| CE28 | VC | VEC | GMA | 10 | 18:1 | 46:1 | AIBN (0.02) | Hexanes | A | 12.6 |
| 29 | VC | VEC | | 5 | 18:1 | | AIBN (0.8) | DMSO | D (50) | 84.1 |
| 30 | VC | VEC | | 50 | 20:1 | | AIBN (0.4) | NMP | C | 72.8 |
| 31 | VC | VEC | | 50 | 20:1 | | AIBN (0.2) | DMSO | D | 8.4 |
| 32 | VC | VEC | | 5 | 18:1 | | VAZO 52 (0.8) | DMF | A (40) | ND |
| 33 | VC | VEC | | 5 | 10:1 | | AIBN (0.4) | NMP | D (50) | ND |
| 34 | VC | VEC | | 5 | 18:1 | | AIBN (0.8) | DMF | A | ND |
| 35 | VC | VEC | | 5 | 6:1 | | AIBN (0.4) | NMP | D (50) | ND |
| CE36 | VC | DMVP | GMA | 10 | 18:1 | 46:1 | AIBN (0.025) | Hexanes | B | 10.8 |
| 37 | VC | DMVP | | 5 | 18:1 | | AIBN (0.8) | DMSO | D | 70.1 |
| 38 | VC | DMVP | | 5 | 18:1 | | AIBN (0.8) | DMSO | D | 71.9 |
| 39 | VC | DMVP | | 60 | 18:1 | | VAZO 52 (0.25) | DMSO | C | ND |
| 40 | VC | DMVP | | 50 | 18:1 | | VAZO 52 (0.4) | DMSO | C | ND |
| 41 | VC | DMVP | | 5 | 10:1 | | VAZO 52 (0.3) | DMSO | D | ND |
| 42 | VC | DMVP | | 5 | 20:1 | | Trigonox (0.3) | DMSO | D | ND |
| 43 | VC | DMVP | | 5 | 20:1 | | AIBN (0.4) | DMSO | D | 55.3 |
| 44 | VC | DMVP | | 5 | 20:1 | | VAZO 52 (0.4) | DMSO | D | 55.3 |
| 45 | VC | DMVP | | 5 | 20:1 | | AIBN (0.6) | DMSO | D | 60.8 |
| 46 | VC | DMVP | | 5 | 20:1 | | AIBN (0.8) | DMSO | D | 62.7 |
| 47 | VC | DMVP | | 5 | 20:1 | | AIBN (0.8) | DMSO | D | 59 |
| 48 | VC | DMVP | | 2.5 | 20:1 | | AIBN (0.8) | DMSO | D | ND |
| 49 | VC | DMVP | | 4.5 | 20:1 | | AIBN (0.8) | NMP | A | 67.7 |
| 50 | VC | DMVP | | 50 | 20:1 | | AIBN (0.8) | DMSO | C | 77.5 |
| 51 | VC | DMVP | | 5 | 20:1 | | AIBN (0.8) | NMP | A (50) | 68.2 |
| 52 | VC | DMVP | | 2.5 | 20:1 | | AIBN (0.8) | Sulfolane | A | 92.2 |
| 53 | VC | DMVP | | 2.5 | 20:1 | | AIBN (0.8) | HFIP | A | ND |
| 54 | VC | DMVP | | 50 | 20:1 | | AIBN (0.2) | NMP | C (50) | ND |
| 55 | VC | BCA | | 5 | 20:1 | | AIBN (0.8) | NMP | A | ND |
| 56 | VC | NBA | | 5 | 20:1 | | AIBN (0.8) | DMSO | D | 81.7 |
| 57 | VC | PFMA | | 5 | 20:1 | | AIBN (0.8) | DMSO | D | 79.9 |
| 58 | NMM | DMVP | | 5 | 18:1 | | VAZO 52 (0.3) | DMSO | D | 54.5 |
| 59 | NMM | DMVP | | 50 | 20:1 | | AIBN (0.4) | DMSO | D (50) | 71.3 |
| 60 | NVP | DMVP | | 2.5 | 18:1 | | VAZO 52 (0.35) | DMSO | D (55) | 90.2 |
| 61 | VC | NBA | | 5 | 20:1 | | AIBN (0.8) | DMSO | D | 78 |
| 62 | VC | PFMA | | 763 | 20:1 | | AIBN (0.4) | None | D | 81.4 |
| 63 | VC | PFMA | | 5 | 20:1 | | AIBN (0.8) | DMSO | D | 92.3 |
| 64 | VC | PFMA | | 50 | 20:1 | | AIBN (0.8) | DMSO | D | 87 |
| 65 | VC | PFMA | | 8 | 20:1 | | AIBN (0.4) | None | D | 53.9 |
| 66 | VC | PFMA | | 5 | 20:1 | | AIBN (0.4) | DMSO | D | 88.8 |
| CE67 | VC | PEGMA1000 | GLA | 8 | 47:1 | 31:1 | AIBN (0.02) | Hexane | A | 14 |

*All processes were run at 60° C. unless otherwise indicated. ND = Not determined.

Key to monomer abbreviations: vinylene carbonate (VC), 4-Vinyl-1,3-dioxolan-2-one (vinyl ethylene carbonate or VEC), poly(ethylene glycol) methyl ether methacrylate MW500 (PEGMA500), poly(ethylene glycol) methyl ether methacrylate MW360 (PEGMA360), poly(ethylene glycol) methyl ether methacrylate MW1000 (PEGMA1000), dimethyl vinylphosphonate (DMVP), butyl cyanoacrylate (BCA), N-Butyl acrylate (NBA), pentafluoropropyl methacrylate (PFMA), glycidal acrylate (GLA), glycidal methacrylate (GMA), N-methylmaleimide (NMM), and dimethyl vinylphosphonate (DMVP). VAZO 52 refers to 2,2'-azobis (2,4-dimethylvaleronitrile).

Process A

A 25 ml reaction vial was outfitted with a stir bar and charged with a first monomer (M1), a second monomer (M2), and where indicated, a third monomer (M3), solvent, and initiator under argon. The mixture was sparged with argon and then sealed. The reaction vial was placed in a heating block at the temperature indicated in Table 1. Initiation was indicated by formation of bubbles. The vial was then stirred at the temperature indicated for the period of time indicated in Table 1. An off-white viscous solution resulted which was poured into ~250 ml of stirring MeOH to form long strings of polymer. The supernatant was decanted, and the product was washed with MeOH and then triturated with MeOH for 24 hours. The MeOH was decanted and trituration repeated. The isolated product was then dried at 40° C. under vacuum (1 torr) for 2 days to yield off-white strings of polymeric product.

Process B

A 500 ml reaction vessel was outfitted with an overhead stirrer nitrogen inlet/outlet and purged with nitrogen. Under $N_2$ the flask was charged with the first monomer (M1), the second monomer (M2), where indicated, a third monomer (M3), solvent (anhydrous 99.9%, 80 ml), and initiator to give a clear solution. The flask was covered with aluminum foil to protect from light and then heated the temperature indicated in Table 1 in an oil bath. After the period of time indicated in Table 1, the reaction was removed from heating giving a very viscous solution. A 5 L reaction vessel was outfitted with a stir bar, nitrogen inlet, addition funnel and charged with 2.5 l MeOH. The viscous polymer solution was then slowly added to stirring MeOH via addition funnel. A white precipitate formed. The supernatant was decanted, and the product triturated with MeOH for 24 hours. The MeOH was decanted. This was repeated. The isolated product was then dried at 40° C. under vacuum (1 torr) for 2 days to yield off-white strings of polymeric product.

Process C

A 500 mL reaction flask was outfitted with a stir bar, gas inlet/outlet, and oil bath. The flask was purged with argon and charged with VC, hexanes, and initiator and heated to the temperature indicated in Table 1. The first monomer (M1), second monomer (M2), and where indicated, third monomer (M3), were weighed out and combined in a vial for intermittent dosing. 6 ml of the monomer solution was added after 30 minutes and the reaction was stirred at the temperature indicated in Table 1 for 16 hours. After 16 hours a gel formed beneath the hexanes layer. An additional 10 ml of the monomer mixture was added and the reaction continued for an additional 24 hours. The remainder of the monomer mixture was then added and the reaction continued and monitored by NMR. After 4 days a small amount of unreacted M1 remained. An additional dose of initiator was added and the reaction was continued overnight resulting in a translucent solid. The reaction was cooled to room temp, the hexanes layer was decanted, and the solid was broken up and washed multiple times with hexanes. The solid was transferred to 1l round bottom flask and dried via rotary evaporation at 60° C. and then in a vacuum oven at 60° C. for 2 days.

Process D

A 20 ml reaction vial was outfitted with a stir bar and charged with the first monomer, the second monomer, solvent, and initiator under argon. The mixture was sparged with argon and then sealed. The reaction vial was placed in a heating block at the temperature indicated in Table 1. Progression of the reaction was monitored by NMR until the first monomer was consumed or the reaction stopped. When complete, an off-white viscous solution resulted which was poured into 250 ml of stirring MeOH to form long strings of polymer. The supernatant was decanted, and the product washed with MeOH and then triturated with MeOH for 24 hours. The MeOH was decanted and the trituration repeated. The isolated product was then dried at 40° C. under vacuum (1 torr) for 2 days to yield off-white strings of polymeric product.

Table 1 above shows that the monomers used in this disclosure result in polymerization reactions surprisingly with much higher yields than the Comparative Examples. This generally equates to even better monomer incorporation rates and more uniform polymers. Without being bound by theory, the polymers produced in the Comparative Examples having monomers containing glycidyl groups, which contain ether bonds, are believed to dissociate in the presence of solvents, undesirably resulting in low molecular weight polymers This effect makes it more difficult to make films useful herein, potentially resulting in detrimental effects in battery applications and in particular high voltage battery applications.

Molecular Weight Determination by Gel permeation chromatography (GPC), also known as size exclusion chromatography SEC testing, was performed using an Agilent 1100 HPLC equipped with a thermostatted column oven, a refractive index detector, and a variable wavelength UV-Vis detector.

The columns used for the separation were Agilent PLgel Mixed-C columns (5 µm, 300 mm×7.5 mm) which have a nominal linear molar mass separation range from 200-2,000,000 g/mol. These columns were packed with a stationary phase comprising-5 µm gel particles, which are composed of a highly crosslinked polystyrene/divinylbenzene matrix. These columns were organic GPC columns, compatible with most organic mobile phase solvents. Two identical columns were connected in a series to maximize the overall system resolution.

A portion of the samples were transferred by spatulas into a glass vial fitted with a PTFE lined metal screw cap. The samples were then immersed in the mobile phase comprising dimethyl sulfoxide (DMSO) plus 0.1% lithium bromide to produce a concentration of approximately 2 mg/mL. The samples were then heated in DMSO at 35° C. for about 20 hours with minor agitation.

The polymer of Examples 23, 31, 50, and 53 were tested for Mw and dispersity. Their respective molecular weights (Mw) were 50,100 Da, 4,940 Da, 112,461 Da, and 81,500

Da, and their respective dispersity values were 3.3, 1.6, and 3.9. Their Mn values were 15,600 Da, 3,060 Da, and 20,800 Da, respectively. Their Mz values were 97,000 Da, 8,340 Da, and 162,000 Da. The surprising effect was that after the polymer of the disclosure was in contact with the solvent, and in this case, DMSO, the molecular weight did not deteriorate. Data collected by refractive index (RI) detection was used for characterization of the molecular weights and dispersities of the samples. The data was analyzed using the Agilent GPC/SEC software Version 2.2. A calibration curve was created that comprised narrow polyethylene oxide/glycol standards with molar masses between approximately 200 and 1,500,000 g/mol. The two standards with the highest molar masses and the standard with the lowest molar mass were not used as they were outside the exclusion limit and permeation limits of the columns; however, the calibration curve was linear (r2=0.9947) for extrapolating down to the permeation limit (system peak, ~16.7 min elution time).

Molar mass moments and dispersity (D) were calculated by Agilent GPC/SEC Software (Version 2.2) as:

$$M_n = \frac{\sum M_i N_i}{\sum N_i} \quad M_w = \frac{\sum M_i^2 N_i}{\sum M_i N_i} \quad M_z = \frac{\sum M_i^3 N_i}{\sum M_i^2 N_i} \quad Đ = \frac{M_w}{M_n}$$

where Mn is the number average molar mass moment (equal number of molecules above and below this molar mass in the distribution), Mw is the mass average molar mass moment (equal weight of molecules above and below this molar mass in the distribution), and Mz is a higher order z-average molar mass moment, more sensitive to the higher molar mass polymers in a distribution. The dispersity (D) characterizes the broadness of the molar mass distribution. The larger the D, the broader the distribution, with D=1 for a uniform compound.

Film Formation

The resulting polymers were dissolved in solvent and blade cast. The parameters used for film formation are provided in Table 2, below. Thicknesses of the resulting polymers were also determined as described below and is reported in Table 2. The polymers identified in the Tables were each dissolved in DMSO or NMP with a concentration of 15 mass %. According to this process, 1 gram of polymer can be dissolved in about 6 g of DMSO. A metal salt, specifically lithium bis(trifluoromethanesulfonyl)imide (LiTFSI), was added to the solution at the ratios shown in Table 2. The resulting mixed solution was then cast onto aluminum foil with a wet gap of 82-100 μm. The casted solution was dried in a convection oven at 40° C. for 3-12 hours and films were obtained. The resulting film was further dried in a vacuum oven at 40° C. for 12 hours. The final film was stamped into a 1.327 cm² area coincell for further testing, e.g., conductivity and thickness testing. The films were also observed for whether they were free-standing.

Conductivity

Conductivities of select examples were determined and are reported in Table 2 according to electrochemical impedance spectroscopy (EIS) as described below. The polymer blend composition and resulting conductive films were substantially more stable where the conductive film had a polymer composition onset current that occurs at higher voltages. This effect was evidenced when measuring and interpreting through cyclic voltammetry (CV), a type of electrochemical potential measurement that measures the current as a result of the applied voltage. As the voltage was increased, the current was measured. Surprisingly and unexpectedly, high stability at high voltages was observed, as reflected by steady normalized current at elevated potentials, until the current increased significantly. Stabilities at voltages as high as 5.0V vs. Li$^+$/Li were observed for some examples, e.g., Ex. 50.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

TABLE 2

Film Formation & Properties

| Ex. | Film Solvent | Polymer:solvent (mass ratio) [Viscosity cP] | Polymer:LiTFSI (mass ratio) | Film Thickness (μm) | Blade Cast free standing? | Conductivity mS/cm | Oxidative Stability (V vs. Li⁰/Li⁺) |
|---|---|---|---|---|---|---|---|
| CE1 | NMP | 1:20 | 1:2.55 | 40 | NO | 0.17 | |
| CE2 | NMP | 1:20 | 1:2.335 | 20 | YES | 0.01 | |
| CE3 | NMP | 1:49 | 1:2.303 | 43 | NO | 0.19 | |
| CE4 | DMSO | | | | YES | | 3.8 V |
| CE5 | NMP | 1:49 | 1:2.335 | 40 | YES | 0.003 | 3.8 V |
| CE6 | NMP | 1:49 | 1:2.227 | 45 | NO | 0.05 | |
| CE7 | NMP | 1:65 | 1:2.224 | 39 | NO | 0.53** | |
| CE8 | NMP | 1:66 | 1:2.246 | 59 | NO | 0.68** | |
| CE9 | NMP | 1:50 | 1:2.25 | 52 | NO | 0.55** | |
| CE10 | NMP | 1:50 | 1:2.25 | 45 | NO | 0.5** | |
| CE11 | NMP | 1:50 | 1:2.25 | 55 | NO | 0.35** | |
| CE12 | NMP | 1:20 | 1:2.33 | 30 | NO | 1 | |
| CE13 | DMSO | 1:6 | 1:1.5 | | NO | 0.1 | |
| 16 | DMSO | 1:6 | 1:1.5 | | NO | 0.1 | 3.7 V |

TABLE 2-continued

Film Formation & Properties

| Ex. | Film Solvent | Polymer:solvent (mass ratio) [Viscosity cP] | Polymer:LiTFSI (mass ratio) | Film Thickness (μm) | Blade Cast free standing? | Conductivity mS/cm | Oxidative Stability (V vs. Li⁰/Li⁺) |
|---|---|---|---|---|---|---|---|
| 17 | DMSO | 1:6 | 1:1.5 | | NO | 0.08 | |
| 18 | DMSO | 1:6 | 1:1.5 | 32 | NO | 0.08 | |
| 19 | DMSO | 1:6.5 | 1:1.165 | 32 | NO | 0.1 | |
| 21 | DMSO | 1:20 | 1:1.5 | 19 | NO | 0.11 | |
| 22 | DMSO | 1:14 | 1:1.5 | 124 | NO | 0.315* | |
| 23 | DMSO | 1:10 [156.8] | 1:1.3 | 55 | YES | 0.047 | |
| 25 | DMSO | 1:6 | 1:1.5 | 11 | NO | 0.003 | |
| 26 | | | | | NO | | 3.4 V |
| CE28 | DMSO | 1:6 | 1:1.5 | | YES | 0.06 | 5.5 V |
| 29 | DMSO | 1:6 | 1:1.5 | 43 | YES | 0.12 | |
| 30 | DMSO | 1:6 | 1:1.165 | 35 | NO | 0.11 | |
| 31 | | | | | NO | | |
| 38 | DMSO | 1:4.9 | 1:1.165 | 19 | YES | 0.205 | 5.5 V |
| 39 | | | | | YES | | |
| 40 | | | | | YES | | |
| 50 | NMP | 1:6 [531] | 1:1.5 | | YES | 0.03 | 5 V |
| 59 | DMSO | 1:6 | 1:1.5 | 40 | NO | NA | NA |
| 60 | DMSO | 1:6 | 1:1.5 | 35 | YES | 0.0001 | NA |
| 61 | NMP | 1:9 [400] | 9:10 | 40 | YES | 0.0001 | NA |
| 62 | DMSO | 1:9 [1,300] | 1:3 | 35 | YES | 0.15 | 4.75 |
| 63 | DMSO | 1:9 [1,600] | 1:3 | 35 | YES | 0.14 | 4.8 |
| 64 | DMSO | 1:9 [1,200] | 1:3 | 20 | YES | 0.17 | 4.83 |
| 66 | DMSO | 1:9 [2,100] | 1:3 | 35 | YES | 0.1 | 4.78 |
| CE67 | NMP | 2:100 | 2:5 | 40 | NO | 0.01 | NA |

**These examples exhibited high conductivities due to the very low molecular weight of the resulting polymer. The film appeared to have plasticized with very short chains as a quasi-solid, similar to wax. The film could not be lifted as a free standing membrane (membrane liftability corresponds with a large increase in molecular weight). As discussed above, greater molecular weight polymers are desirable so that less polymer is required, resulting in a greater overall salt content and a greater "true" dry conductivity.

While illustrative and presently preferred embodiments of the disclosed methods, separators, and batteries have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or ±0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or ±0.1% from the specified value, as such variations are appropriate to in the context of the systems, devices, circuits, methods, and other implementations described herein. When a claim element is referred to as being "selected from the group consisting of" followed by a list of compositions, the element may be selected from any combination of one or more of those alternative compositions.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A solid state battery, comprising:
   a solid state anode;
   a solid state cathode; and
   a solid state metal ion conductive separator sandwiched between the solid state anode and the solid state cathode;
   wherein at least one of the solid state anode and the solid state metal ion conductive separator comprises a composition comprising:
   a metal salt; and
   a copolymer, comprising as copolymerized units:
      a vinylene carbonate compound as a first monomer; and at least one additional monomer different from the first monomer and copolymerizable with the first monomer, with the proviso that the at least one additional monomer does not comprise a glycidyl group; and wherein the at least one additional monomer is selected from the group consisting of a poly (ethylene glycol) methacrylate (PEGMA), 1,3-propene sultone (PES), bis(2,2,2-trifluoroethyl) maleate (TFM), vinyl ethylene carbonate (VEC), dimethyl vinylphosphonate (DMVP), maleic anhydride (MA), diethylvinylphosphonate (DEVP), diethyl allylphosphonate (DEAP), N-vinylpyrrolidone (NVP), N-methylmaleimide, vinylene sulfate, vinylene sulfite, vinyl ethylene sulfite, butadiene sulfone, vinylsulfonic acid (VSA), N,N-dimethylvinylsulfonamide, vinylsulfonyl fluoride, fluoro(vinyl) phosphinic acid, vinylphosphonic acid, 2-vinyl-1,3,2-dioxaphospholane-2-oxide, a metal vinylsulfonate, a metal vinylphosphonate, a metal fluoro (vinyl) phosphinate, 1-vinylpyrrolidine-2,5-dione, vinylboronic acid, a metal trifluoro (vinyl) boronate, 2-vinyl-1,3,2-dioxaborolane-4,5-dione, and a metal 2-fluoro-2-vinyl-1,3,2-dioxaborolate-4,5-dione; and wherein a molar ratio of the first monomer to the at least one additional monomer is from 4:1 to 99:1.

2. A solid state lithium ion battery, comprising:

a solid state anode capable of intercalation and de-intercalation of lithium ions;

a solid state cathode capable of intercalation and de-intercalation of lithium ions; and a solid state lithium ion conductive separator sandwiched between the anode and the cathode;

wherein at least one of the solid state anode, the solid state cathode and the solid state separator comprises a composition comprising:

a metal salt; and a copolymer, comprising as copolymerized units:

a vinylene carbonate compound as a first monomer; and at least one additional monomer different from the first monomer and copolymerizable with the first monomer, with the proviso that the at least one additional monomer does not comprise a glycidyl group; and wherein the at least one additional monomer is selected from the group consisting of a poly (ethylene glycol) methacrylate (PEGMA), 1,3-propene sultone (PES), bis(2,2,2-trifluoroethyl) maleate (TFM), vinyl ethylene carbonate (VEC), dimethyl vinylphosphonate (DMVP), maleic anhydride (MA), diethylvinylphosphonate (DEVP), diethyl allylphosphonate (DEAP), N-vinylpyrrolidone (NVP), N-methylmaleimide, vinylene sulfate, vinylene sulfite, vinyl ethylene sulfite, butadiene sulfone, vinylsulfonic acid (VSA), N,N-dimethylvinylsulfonamide, vinylsulfonyl fluoride, fluoro (vinyl) phosphinic acid, vinylphosphonic acid, 2-vinyl-1,3,2-dioxaphospholane-2-oxide, a metal vinylsulfonate, a metal vinylphosphonate, a metal fluoro (vinyl) phosphinate, 1-vinylpyrrolidine-2,5-dione, vinylboronic acid, a metal trifluoro (vinyl) boronate, 2-vinyl-1,3,2-dioxaborolane-4,5-dione, and a metal 2-fluoro-2-vinyl-1,3,2-dioxaborolate-4,5-dione; and wherein a molar ratio of the first monomer to the at least one additional monomer is from 4:1 to 99:1.

3. The solid state lithium ion battery of claim 2, wherein the solid state lithium ion conductive separator comprises the composition, and wherein the lithium salt is selected from the group consisting of lithium bis(trifluoromethanesulfonylamide (LiTFSA), lithium bis(oxalato)borate (LiBOB), lithium bis(trifluoromethanesulfonyl) imide (LiTFSI), LiPF$_6$, LiBF2($C_2O_4$), LiC$_2$O$_4$, CF$_3$CO$_2$Li, and C$_6$H$_5$COOLi.

4. The solid state lithium ion battery of claim 2, wherein the solid state lithium ion conductive separator further comprises at least one of (i) a polymer different from the copolymer, and (ii) an additive selected from the group consisting of a clay, a metal oxide, a metal nitride, and a lithium conductive ceramic.

5. The solid state lithium ion battery of claim 2, wherein the solid state lithium ion conductive separator comprises a lithium conductive ceramic, and wherein the lithium conductive ceramic is selected from the group consisting of lithium aluminum titanium phosphate (LATP), lithium lanthanum zirconium oxide (LLZO), lithium silicon phosphorous sulfur chloride (LSPSC1), lithium germanium phosphorous sulfide (LGPS), a lithium conductive halide, a closo-borate, and a nido-borate.

6. The solid state lithium ion battery of claim 2, wherein the solid state lithium ion conductive separator is in the form of a film having a thickness less than 30 microns, and wherein the film has an ionic conductivity of 0.05 mS/cm or greater.

7. The solid state lithium ion battery of claim 2, wherein the solid state anode comprises the composition, and wherein the lithium salt is selected from the group consisting of lithium bis(trifluoromethanesulfonylamide (LiTFSA), lithium bis(oxalato)borate (LiBOB), lithium bis(trifluoromethanesulfonyl)imide (LiTFSI), LiPF$_6$, LiBF2 ($C_2O_4$), LiC$_2$O$_4$, CF$_3$CO$_2$Li, and C$_6$H$_5$COOLi.

8. The solid state lithium ion battery of claim 2, wherein the solid state cathode comprises the composition, and wherein the lithium salt is selected from the group consisting of lithium bis(trifluoromethanesulfonylamide (LiTFSA), lithium bis(oxalato)borate (LiBOB), lithium bis(trifluoromethanesulfonyl)imide (LiTFSI), LiPF$_6$, LiBF$_2$ ($C_2O_4$), LiC$_2$O$_4$, CF$_3$CO$_2$Li, and C$_6$H$_5$COOLi.

9. The solid state lithium ion battery of claim 2, with the proviso that the at least one additional monomer does not comprise an epoxy group and is not formed from a compound comprising an epoxy group.

10. The solid state battery of claim 1, wherein the first monomer is vinylene carbonate.

11. The solid state battery of claim 1, wherein the first monomer is a derivative of vinylene carbonate or an analogue of vinylene carbonate.

12. The solid state battery of claim 1, with the proviso that the at least one additional monomer does not comprise an epoxy group and is not formed from a compound comprising an epoxy group.

13. The solid state battery of claim 1, wherein the at least one additional monomer comprises two additional monomers different from one another, each selected from the group consisting of a poly (ethylene glycol) methacrylate (PEGMA), 1,3-propene sultone (PES), bis(2,2,2-trifluoroethyl) maleate (TFM), vinyl ethylene carbonate (VEC), dimethyl vinylphosphonate (DMVP), maleic anhydride (MA), diethylvinylphosphonate (DEVP), diethyl allylphosphonate (DEAP), N-vinylpyrrolidone (NVP), N-methylmaleimide, vinylene sulfate, vinylene sulfite, vinyl ethylene sulfite, butadiene sulfone, vinylsulfonic acid (VSA), N,N-dimethylvinylsulfonamide, vinylsulfonyl fluoride, fluoro (vinyl) phosphinic acid, vinylphosphonic acid, 2-vinyl-1,3,2-dioxaphospholane-2-oxide, a metal vinylsulfonate, a metal vinylphosphonate, a metal fluoro (vinyl) phosphinate, 1-vinylpyrrolidine-2,5-dione, vinylboronic acid, a metal trifluoro (vinyl) boronate, 2-vinyl-1,3,2-dioxaborolane-4,5-dione, and a metal 2-fluoro-2-vinyl-1,3,2-dioxaborolate-4,5-dione.

14. The solid state battery of claim 1, wherein the at least one additional monomer is 2,2,3,3,3-pentafluoropropyl methacrylate (PFMA), 1,1,1,3,3,3-hexafluoroisopropyl methacrylate, or 2,2,3,3-tetrafluoropropyl methacrylate.

15. A solid state battery, comprising:
a solid state anode;
a solid state cathode; and
a solid state metal ion conductive separator sandwiched between the solid state anode and the solid state cathode;
wherein at least one of the solid state anode and the solid state metal ion conductive separator comprises a composition comprising:
a metal salt; and
a copolymer, comprising as copolymerized units:
a vinylene carbonate compound as a first monomer; and
at least one additional monomer different from the first monomer and copolymerizable with the first monomer, with the proviso that the at least one additional monomer does not comprise a glycidyl group;
wherein a molar ratio of the first monomer to the at least one additional monomer is from 4:1 to 99:1, and wherein the copolymer has a molecular weight greater than 50,000 Da and a density from 0.5 g/cm$^3$ to 2.5 g/cm$^3$.

16. The solid state battery of claim 15, wherein the at least one additional monomer comprises two additional monomers different from one another, each selected from the group consisting of a poly(ethylene glycol) methacrylate (PEGMA), 1,3-propene sultone (PES), bis(2,2,2-trifluoroethyl) maleate (TFM), vinyl ethylene carbonate (VEC), dimethyl vinylphosphonate (DMVP), maleic anhydride (MA), diethylvinylphosphonate (DEVP), diethyl allylphosphonate (DEAP), N-vinylpyrrolidone (NVP), N-methylmaleimide, vinylene sulfate, vinylene sulfite, vinyl ethylene sulfite, butadiene sulfone, vinylsulfonic acid (VSA), N,N-dimethylvinylsulfonamide, vinylsulfonyl fluoride, fluoro(vinyl) phosphinic acid, vinylphosphonic acid, 2-vinyl-1,3,2-dioxaphospholane-2-oxide, a metal vinylsulfonate, a metal vinylphosphonate, a metal fluoro(vinyl)phosphinate, 1-vinylpyrrolidine-2,5-dione, vinylboronic acid, a metal trifluoro(vinyl)boronate, 2-vinyl-1,3,2-dioxaborolane-4,5-dione, and a metal 2-fluoro-2-vinyl-1,3,2-dioxaborolate-4,5-dione.

17. The solid state battery of claim 15, wherein the at least one additional monomer is 2,2,3,3,3-pentafluoropropyl methacrylate (PFMA), 1,1,1,3,3,3-hexafluoroisopropyl methacrylate, or 2,2,3,3-tetrafluoropropyl methacrylate.

18. The solid state battery of claim 15, wherein the copolymer is not crosslinked.

19. The solid state battery of claim 15, wherein the copolymer has a melting point of 200° C. or greater.

20. The solid state battery of claim 15, wherein the copolymer does not exhibit a melting point and has an oxidation point of 350° C. or greater.

21. The solid state battery of claim 15, wherein the copolymer has a molecular weight greater than 80,000 Da.

22. The solid state battery of claim 15, with the proviso that the at least one additional monomer does not comprise an epoxy group and is not formed from a compound comprising an epoxy group.

23. The solid state battery of claim 15, wherein the at least one additional monomer is poly(ethylene glycol) methacrylate (PEGMA), vinyl ethylene carbonate (VEC), or dimethyl vinylphosphonate (DMVP).

24. The solid state battery of claim 15, wherein the copolymer is prepared using a solvent comprising dimethyl sulfoxide, tetrahydrofuran, or N-methyl-2-pyrrolidone.

25. The solid state battery of claim 15, wherein the copolymer is prepared using a polymerization initiator comprising 2,2'-azobis(2,4-dimethylvaleronitrile).

* * * * *